US012725417B1

(12) United States Patent
Piche et al.

(10) Patent No.: US 12,725,417 B1
(45) Date of Patent: Sep. 1, 2026

(54) SYSTEMS AND METHODS FOR ASYNCHRONOUSLY PROCESSING IMAGE DATA

(71) Applicant: Geotab Inc., Oakville (CA)

(72) Inventors: Christopher Piche, Abu Dhabi (AE); Gleb Odinokikh, Dubai (AE)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/530,435

(22) Filed: Feb. 5, 2026

Related U.S. Application Data

(60) Provisional application No. 63/924,090, filed on Nov. 24, 2025.

(51) Int. Cl.
*G06V 20/40* (2022.01)
*G06V 20/56* (2022.01)

(52) U.S. Cl.
CPC .............. *G06V 20/44* (2022.01); *G06V 20/56* (2022.01)

(58) Field of Classification Search
None
See application file for complete search history.

(56) References Cited

U.S. PATENT DOCUMENTS 7,505,841 B2 3/2009 Sun et al.
7,676,087 B2 3/2010 Dhua et al.
9,405,970 B2 8/2016 Israel et al.
9,489,635 B1 11/2016 Zhu
10,496,891 B2 12/2019 Sai
10,728,420 B2 7/2020 Popa
10,997,434 B2 5/2021 Kurian et al.
11,336,867 B2 5/2022 Meier et al.
11,669,907 B1 * 6/2023 Behrens .................. H04L 67/10 705/4
11,758,096 B2 9/2023 Shah et al.
(Continued)

FOREIGN PATENT DOCUMENTS

CN 109460780 A * 3/2019 ............. G06N 3/084

OTHER PUBLICATIONS

Chen, Hai-Bo. Google Patent Translation of CN 109460780A, assigned to Deep Blue Technology, Oct. 2018, Safe driving of vehicle detection method, device and the storage medium of artificial neural network, Accessed Apr. 18, 2026, https://patents.google.com/patent/CN109460780A/en?oq=CN109460780A (Year: 2018).*

*Primary Examiner* — Tahmina N Ansari
(74) *Attorney, Agent, or Firm* — Lawrence Xin-Tao Yu

(57) ABSTRACT

Systems and methods for asynchronously processing image data are provided. The systems and methods involve: at least one camera operable to capture images; and at least one processor operable to: apply at least one first machine learning model to a first subset of the images to detect an event and determine a first predicted probability in substantially real-time; determine that the first predicted probability satisfies a first confidence criterion; in response, apply at least one second machine learning model to a second subset of the images to determine a second predicted probability asynchronously and with a longer cumulative execution time; determine that the second predicted probability of the event satisfies a second confidence criterion; and in response, transmit an indication of the event, whereby a user remotely located from the imaging device can be notified of the event.

21 Claims, 10 Drawing Sheets

(56) References Cited

U.S. PATENT DOCUMENTS

| | | | | |
|---|---|---|---|---|
| 11,866,055 | B1 * | 1/2024 | Srinivasan | B60W 40/09 |
| 11,928,737 | B1 * | 3/2024 | Behrens | G06N 3/09 |
| 11,990,036 | B2 * | 5/2024 | Julian | G07C 5/0808 |
| 11,995,546 | B1 * | 5/2024 | Srinivasan | B60W 40/09 |
| 2016/0343145 | A1 | 11/2016 | Israel et al. | |
| 2021/0280056 | A1 * | 9/2021 | Julian | G08G 1/04 |
| 2022/0126864 | A1 * | 4/2022 | Moustafa | B60W 60/0013 |
| 2022/0245955 | A1 | 8/2022 | Freeman et al. | |
| 2023/0038842 | A1 | 2/2023 | Yu et al. | |
| 2023/0401274 | A1 * | 12/2023 | Denninghoff | G06F 16/9577 |
| 2024/0005675 | A1 | 1/2024 | Lelowicz et al. | |
| 2024/0273922 | A1 * | 8/2024 | Espel-Logan | G06Q 30/016 |
| 2024/0375663 | A1 * | 11/2024 | Nichols | G06N 20/00 |

* cited by examiner

SYSTEMS AND METHODS FOR ASYNCHRONOUSLY PROCESSING IMAGE DATA

CROSS-REFERENCE TO RELATED APPLICATIONS

This application claims priority to U.S. Provisional Patent Application No. 63/924,090 filed Nov. 24, 2025 and titled "SYSTEMS AND METHODS FOR ASYNCHRONOUSLY PROCESSING IMAGE DATA" the contents of which are incorporated herein by reference for all purposes.

FIELD

The embodiments described herein generally relate to telematics devices and processing image data, and in particular, to processing image data asynchronously.

BACKGROUND

The following is not an admission that anything discussed below is part of the prior art or part of the common general knowledge of a person skilled in the art.

Imaging devices, such as, but not limited to, video telematics devices, can produce large volumes of image data. For example, a typical 1-hour video having 1080p (1920×1080 progressively displayed pixels) resolution, 30 fps (frames per second) frame rate, and 5 Mbps (megabits per second) bitrate has a file size of approximately 2.25 GB (gigabytes). Processing large volumes of image data in real-time requires considerable computational effort and hardware capability. Many imaging devices have hardware limitations that make processing video at the imaging device in real-time a significant challenge.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided an imaging device. The imaging device includes at least one camera operable to capture images; and at least one processor operable to: apply at least one first machine learning model to a first subset of the images to detect an event and determine a first predicted probability of the event, the at least one first machine learning model being executed in substantially real-time with respect to the first subset of the images being captured; determine whether the first predicted probability of the event satisfies a first confidence criterion; in response to determining that the first predicted probability of the event satisfies a first confidence criterion: apply at least one second machine learning model to a second subset of the images to determine a second predicted probability of the event, the at least one second machine learning model being executed asynchronously with respect to the at least one first machine learning model, and the application of the at least one of second machine learning model having a longer cumulative execution time than the application of the at least one first machine learning model; determine whether the second predicted probability of the event satisfies a second confidence criterion; and in response to determining that the second predicted probability of the event satisfies the second confidence criterion, transmit an indication of the event, whereby a user remotely located from the imaging device can be notified of the event.

In accordance with a broad aspect, there is provided a method for asynchronously processing image data. The method involves operating at least one processor to: capture, using at least one camera, images; apply at least one first machine learning model to a first subset of the images to detect an event and determine a first predicted probability of the event, the at least one first machine learning model being executed in substantially real-time with respect to the first subset of the images being captured; determine whether the first predicted probability of the event satisfies a first confidence criterion; in response to determining that the first predicted probability of the event satisfies a first confidence criterion: apply at least one second machine learning model to a second subset of the images to determine a second predicted probability of the event, the at least one second machine learning model being executed asynchronously with respect to the at least one first machine learning model, and the application of the at least one of second machine learning model having a longer cumulative execution time than the application of the at least one first machine learning model; determine whether the second predicted probability of the event satisfies a second confidence criterion; and in response to determining that the second predicted probability of the event satisfies the second confidence criterion, transmit an indication of the event, whereby a user remotely located from the imaging device can be notified of the event.

In some embodiments, the first subset of the images can include less image data than the second subset of the images.

In some embodiments, the first subset of the images can have a lower frame rate than the second subset of the images.

In some embodiments, the first subset of the images can have a lower resolution than the second subset of the images.

In some embodiments, the second subset of the images can include a region of interest of the first subset of the images.

In some embodiments, the first subset of the images and second subset of the images can include images captured before, during, and after the event.

In some embodiments, the at least one processor can include at least one first processor and at least one second processor, the at least one first processor operable to apply the at least one first machine learning model to the first subset of the images, and the at least one second processor operable to apply the at least one second machine learning model to the second subset of the images.

In some embodiments, the at least one first processor can include at least one coprocessor and the at least one second processor includes at least one primary processor.

In some embodiments, the at least one coprocessor can include at least one graphical processing unit (GPU) and/or at least one digital signal processor (DSP) and the at least one primary processor includes at least one central processing unit (CPU).

In some embodiments, the at least one first machine learning model can include fewer models than the at least one second machine learning model.

In some embodiments, applying the at least one second machine learning model to the second subset of the images can include applying the at least one second machine learning model to the second subset of the images to detect at least one other event that was not detected by the at least one first machine learning model; and an indication of the at least one other event can also be transmitted with the indication of the event.

In some embodiments, applying the at least one second machine learning model to the second subset of the images can include applying at least one second machine learning model to the second subset of the images to identify contextual data associated with the event; and the contextual data can also be transmitted with the indication of the event.

In some embodiments, the contextual data can include a make, model, and/or license plate number of another vehicle.

In some embodiments, the at least one processor can be further operable to: determine whether the first predicted probability of the event satisfies a third confidence criterion; and in response to determining that the first predicted probability of the event satisfies the third confidence criterion, generate an audio alert at the imaging device.

In some embodiments, the second confidence criterion can be stricter than the first confidence criterion.

In some embodiments, the second confidence criterion can be the same as the first confidence criterion.

In some embodiments, the imaging device can further include: at least one accelerometer operable to generate acceleration data; and at least one GPS receiver operable to generate location data. The at least one processor can be further operable to: in response to determining that the predicted probability of the event does not satisfy the first confidence criterion, determine whether at least one of the acceleration data or the location data satisfies a fourth confidence criterion; and in response to determining that the at least one of the acceleration data or the location data satisfies a fourth confidence criterion, apply the at least one second machine learning model to the second subset of the images to determine the second predicted probability of the event.

In some embodiments, the imaging device can be installed at a vehicle and the images can include images of an area in front of the vehicle and/or an interior of the vehicle.

In some embodiments, the event can include an unsafe driving event.

In some embodiments, unsafe driving event can include: the vehicle tailgating another vehicle, the vehicle nearly colliding or colliding with another vehicle and/or other object, the vehicle straddling two lanes, the vehicle performing a rolling stop, and/or the vehicle crossing a solid lane.

In some embodiments, the unsafe driving event can include: a driver of the vehicle drinking and/or eating, the driver not wearing a seatbelt, the driver using a phone, the driver smoking, the driver not viewing the road, and/or the driver yawning.

In some embodiments, the at least one first machine model and the at least one second machine learning model can include at least one common machine learning model.

In some embodiments, the at least one first machine model can include at least one higher-complexity version of the at least one second machine learning model.

In some embodiments, the indication of the event can include a label describing the event.

In some embodiments, the at least one second machine learning model can be further applied on at least one output of the at least one first machine learning model.

In some embodiments, the at least one processor can be further operable to, in response to determining that the second predicted probability of the event satisfies the second confidence criterion, transmit the second subset of the images.

In accordance with a broad aspect, there is provided an onboard imaging device for monitoring a vehicle including: at least one camera operable to capture images of an area in front of the vehicle and/or an interior of the vehicle; and at least one processor including at least one primary processor and at least one coprocessor, the at least one processor operable to: apply, by the at least one coprocessor, at least one first machine learning model to a first subset of the images to detect an unsafe driving event and determine a first predicted probability of the unsafe driving event, the at least one first machine learning model being executed in substantially real-time with respect to the first subset of the images being captured; determine whether the first predicted probability of the unsafe driving event satisfies a first confidence criterion; in response to determining that the first predicted probability of the unsafe driving event satisfies a first confidence criterion, apply: by the at least one primary processor, at least one second machine learning model to a second subset of the images to determine a second predicted probability of the unsafe driving event, the at least one second machine learning model being executed asynchronously with respect to the at least one first machine learning model, the application of the at least one of second machine learning model having a longer cumulative execution time than the application of the at least one first machine learning model, and the second subset of the images including more image data than the first subset of the images; determine whether the second predicted probability of the unsafe driving event satisfies a second confidence criterion; and in response to determining that the second predicted probability of the unsafe driving event satisfies the second confidence criterion, transmit an indication of the unsafe driving event, whereby a user remotely located from the imaging device can be notified of the unsafe driving event.

In accordance with a broad aspect, there is provided a method for asynchronously processing image data. The method involves operating at least one processor, including at least one primary processor and at least one coprocessor, to: capture, using at least one camera, images of an area in front of a vehicle and/or an interior of the vehicle; apply, by the at least one coprocessor, at least one first machine learning model to a first subset of the images to detect an unsafe driving event and determine a first predicted probability of the unsafe driving event, the at least one first machine learning model being executed in substantially real-time with respect to the first subset of the images being captured; determine whether the first predicted probability of the unsafe driving event satisfies a first confidence criterion; in response to determining that the first predicted probability of the unsafe driving event satisfies a first confidence criterion: apply, by the at least one primary processor, at least one second machine learning model to a second subset of the images to determine a second predicted probability of the unsafe driving event, the at least one second machine learning model being executed asynchronously with respect to the at least one first machine learning model, the application of the at least one of second machine learning model having a longer cumulative execution time than the application of the at least one first machine learning model, and the second subset of the images including more image data than the first subset of the images; determine whether the second predicted probability of the unsafe driving event satisfies a second confidence criterion; and in response to determining that the second predicted probability of the unsafe driving event satisfies the second confidence criterion, transmit an indication of the unsafe driving event, whereby a user remotely located from the imaging device can be notified of the unsafe driving event.

In accordance with a broad aspect, there is provided an imaging device including: at least one camera operable to capture images; and at least one processor operable to: apply at least one first machine learning model to a first subset of the images to detect a first event and determine a predicted probability of the first event, the at least one first machine learning model being executed in substantially real-time with respect to the first subset of the images being captured; determine whether the predicted probability of the first event satisfies a first confidence criterion; in response to determining that the predicted probability of the first event satisfies a first confidence criterion: apply at least one second machine learning model to a second subset of the images to detect a second event and determine a predicted probability of the second event, the at least one second machine learning model being executed asynchronously with respect to the at least one first machine learning model, and the application of the at least one of second machine learning model having a longer cumulative execution time than the application of the at least one first machine learning model; determine whether the predicted probability of the second event satisfies a second confidence criterion; and in response to determining that the predicted probability of the second event satisfies the second confidence criterion, transmit an indication of the second event, whereby a user remotely located from the imaging device can be notified of the second event.

In accordance with a broad aspect, there is provided a method for asynchronously processing image data, the method including at least one processor to: capture, using at least one camera, images; apply at least one first machine learning model to a first subset of the images to detect a first event and determine a predicted probability of the first event, the at least one first machine learning model being executed in substantially real-time with respect to the first subset of the images being captured; determine whether the predicted probability of the first event satisfies a first confidence criterion; in response to determining that the predicted probability of the first event satisfies a first confidence criterion: apply at least one second machine learning model to a second subset of the images to detect a second event and determine a predicted probability of the second event, the at least one second machine learning model being executed asynchronously with respect to the at least one first machine learning model, and the application of the at least one of second machine learning model having a longer cumulative execution time than the application of the at least one first machine learning model; determine whether the predicted probability of the second event satisfies a second confidence criterion; and in response to determining that the predicted probability of the second event satisfies the second confidence criterion, transmit an indication of the second event, whereby a user remotely located from the imaging device can be notified of the second event.

In some embodiments, the first subset of the images can include less image data than the second subset of the images.

In some embodiments, the first subset of the images can have a lower frame rate than the second subset of the images.

In some embodiments, the first subset of the images can have a lower resolution than the second subset of the images.

In some embodiments, the second subset of the images can include a region of interest of the first subset of the images.

In some embodiments, the first subset of the images can include images captured before, during, and after the first event and the second subset of the images can include images captured before, during, and after the second event.

In some embodiments, the at least one processor can include at least one first processor and at least one second processor, the at least one first processor operable to apply the at least one first machine learning model to the first subset of the images, and the at least one second processor operable to apply the at least one second machine learning model to the second subset of the images.

In some embodiments, the at least one first processor can include at least one coprocessor and the at least one second processor can include at least one primary processor.

In some embodiments, the at least one coprocessor can include at least one graphical processing unit (GPU) and/or at least one digital signal processor (DSP) and the at least one primary processor includes at least one central processing unit (CPU).

In some embodiments, the at least one first machine learning model can include fewer models than the at least one second machine learning model.

In some embodiments, the second event can include contextual data associated with the first event.

In some embodiments, the contextual data can include a make, model, and/or license plate number of another vehicle.

In some embodiments, the imaging device is installed at a vehicle and the images can include images of an area in front of the vehicle and/or an interior of the vehicle.

In some embodiments, the first event can include an unsafe driving event.

In some embodiments, the unsafe driving event can include: the vehicle tailgating another vehicle, the vehicle nearly colliding or colliding with another vehicle and/or other object, the vehicle straddling two lanes, the vehicle performing a rolling stop, and/or the vehicle crossing a solid lane.

In some embodiments, the unsafe driving event can include: a driver of the vehicle drinking and/or eating, the driver not wearing a seatbelt, the driver using a phone, the driver smoking, the driver not viewing the road, and/or the driver yawning.

In some embodiments, the at least one processor can be further operable to: in response to determining that the predicted probability of the first event satisfies the first confidence criterion, generate an audio alert at the imaging device.

In some embodiments, the at least one processor can be further operable to: in response to determining that the predicted probability of the first event satisfies the first confidence criterion, transmit the first subset of the images; and in response to determining that the predicted probability of the second event satisfies the second confidence criterion, transmit the second subset of the images.

In some embodiments, the at least one processor can be further operable to, in response to determining that the predicted probability of the first event satisfies the first confidence criterion, transmit an indication of the first event, whereby the user can be notified of the first event.

In accordance with a broad aspect, there is provided a non-transitory computer readable medium having instructions stored thereon executable by at least one processor to implement any one of the methods herein.

BRIEF DESCRIPTION OF THE DRAWINGS

Several embodiments will be described in detail with reference to the drawings, in which.

Figure 1:
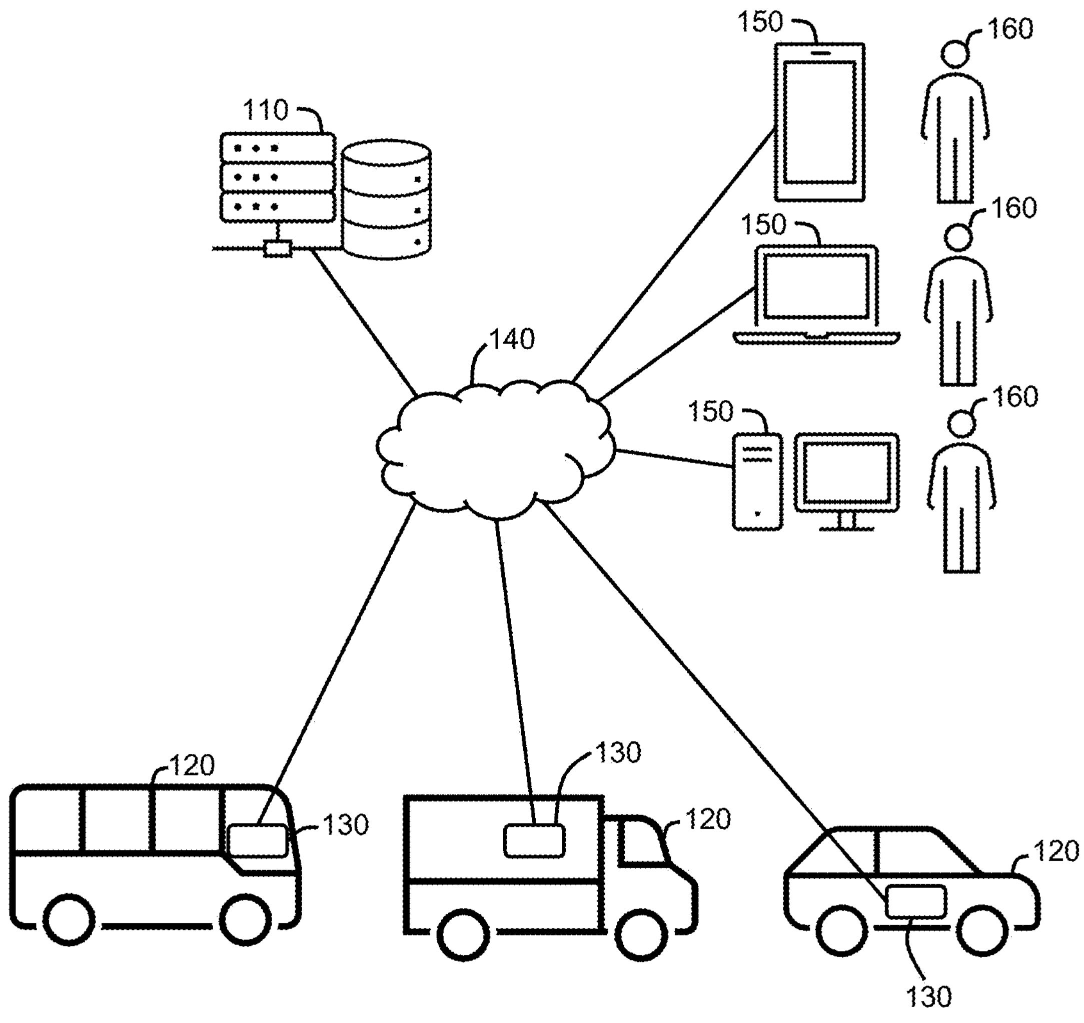
FIG. 1 is a block diagram of various components interacting with an example asset management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example asset management system 110 for managing a plurality of assets 120 monitored by a plurality of telematics devices 130. In operation, the telematics devices 130 can gather various data associated with the assets 120 (i.e., telematics data) and share the telematics data with the asset management system 110. The asset management system can process the telematics data to generate various insights relating to the assets 120. The asset management system 110 can be remotely located from the telematics devices 130 and the assets 120.

For ease of exposition, various examples will now be described in which the assets 120 include vehicles 120, and the asset management system 110 is referred to as a fleet management system 110. However, it should be appreciated that the systems and methods described herein may be used to manage other forms of assets 120 in some embodiments. Such assets can include any apparatuses, articles, and/or machines that can be monitored by the telematics devices 130. For example, the assets 120 may include, but are not limited to, trailers, shipping containers, cargo, equipment, machinery, tools, and/or people. The telematics data can vary depending on the type of asset.

The vehicles 120 can include any machines for transporting goods and/or people. For example, the vehicles 120 can include motor vehicles, such as, but not limited to, motorcycles, cars, trucks, and/or buses. The motor vehicles can be gas, diesel, electric, hybrid, and/or alternative fuel. In some embodiments, the vehicles 120 may include other types of vehicles, such as, but not limited to, railed vehicles (e.g., trains and/or trams), watercraft (e.g., ships and/or boats), aircraft (e.g., airplanes and/or helicopters), and/or spacecraft. In some embodiments, the vehicles 120 may include autonomous, remotely controlled, and/or unmanned vehicles, such as, but not limited to drones (e.g., unmanned aerial vehicles and/or unmanned aircraft systems) and/or self-driving vehicles. The vehicles 120 can each be equipped with one or more telematics devices 130. Although only three vehicles 120 and three telematics devices 130 are shown for ease of illustration, it should be appreciated there can be any number and type of vehicles 120 and telematics devices 130. For example, fleet management system 110 may manage hundreds, thousands, millions, or more vehicles 120 and telematics devices 130.

One or more telematics devices 130 can monitor each vehicle 120. The telematics devices 130 can include various types of devices having different forms, functionalities, and installations. In some embodiments, the telematics devices 130 can include standalone, aftermarket, and/or retrofit devices that are removably installed at the vehicles 120, internally and/or externally, such as, but not limited to, vehicle tracking devices, asset trackers, and/or onboard imaging devices. In some embodiments, the telematics devices 130 can include OEM (original equipment manufacturer), native, and/or factory-installed components that are integral with the vehicle 120, such as, but not limited to, TCUs (telematic control units) and/or ADAS (advanced driver-assistance systems). In some embodiments, the telematics devices 130 can include off-board, fixed-position, and/or stationary devices that are installed adjacent and/or near the vehicle 120, such as, but not limited to, RSE (roadside equipment) and/or offboard imaging devices.

The telematics devices 130 can gather various telematics data associated with the vehicles 120 and share the telematics data with the fleet management system 110. The telematics data may include any information, parameters, attributes, characteristics, and/or features associated with the vehicle 120. For example, the telematics data can include, but is not limited to, location data, speed data, acceleration data, engine data, brake data, transmission data, fluid data (e.g., oil, coolant, and/or washer fluid), energy data (e.g., battery and/or fuel data), odometer data, vehicle identifying data, error/diagnostic data, tire pressure data, seatbelt data, and/or airbag data. In some embodiments, the telematics data can include video data, image data, and/or audio data. In some embodiments, the telematics data may include information related to the telematics devices 130 and/or other devices associated with the telematics devices 130.

The fleet management system 110 can process the telematics data collected from the telematics devices 130 to provide various analysis, predictions, reporting, and/or alerts. For example, the fleet management system 110 can process the telematics data to gain additional information regarding the vehicles 120, such as, but not limited to, trips, idling, harsh braking/driving, usage rate, fuel economy, collision, near collisions, lane violation, rolling stop, tailgating, and/or distracted driving. Various data analytics and machine learning techniques may be used by the fleet management system 110 to process the telematics data. The telematics data can then be used to manage various aspects of the vehicles 120, such as, but not limited to, route planning, vehicle maintenance, driver/vehicle compliance, asset utilization, fuel management, and/or driver coaching. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data stored and/or processed by the fleet management system 110. The computing devices 150 can include any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown for ease of illustration, it should be appreciated that there can be any number of computing devices 150 and users 160. In some embodiments, the fleet management system 110 may service hundreds, thousands, millions, or more computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 can also facilitate communication with other devices and systems.

The fleet management system 110 can be implemented using one or more computers. For example, the fleet management system 110 may be implemented using one or more computer servers. The servers can be distributed across a wide geographical area. In some embodiments, the fleet management system 110 may be implemented using one or more virtual machines and/or cloud computing platforms, such as, but not limited to, Google Cloud Platform™ and/or Amazon Web Services™. In some embodiments, the fleet management system 110 may be implemented using one or more dedicated computer servers.

Figure 2:
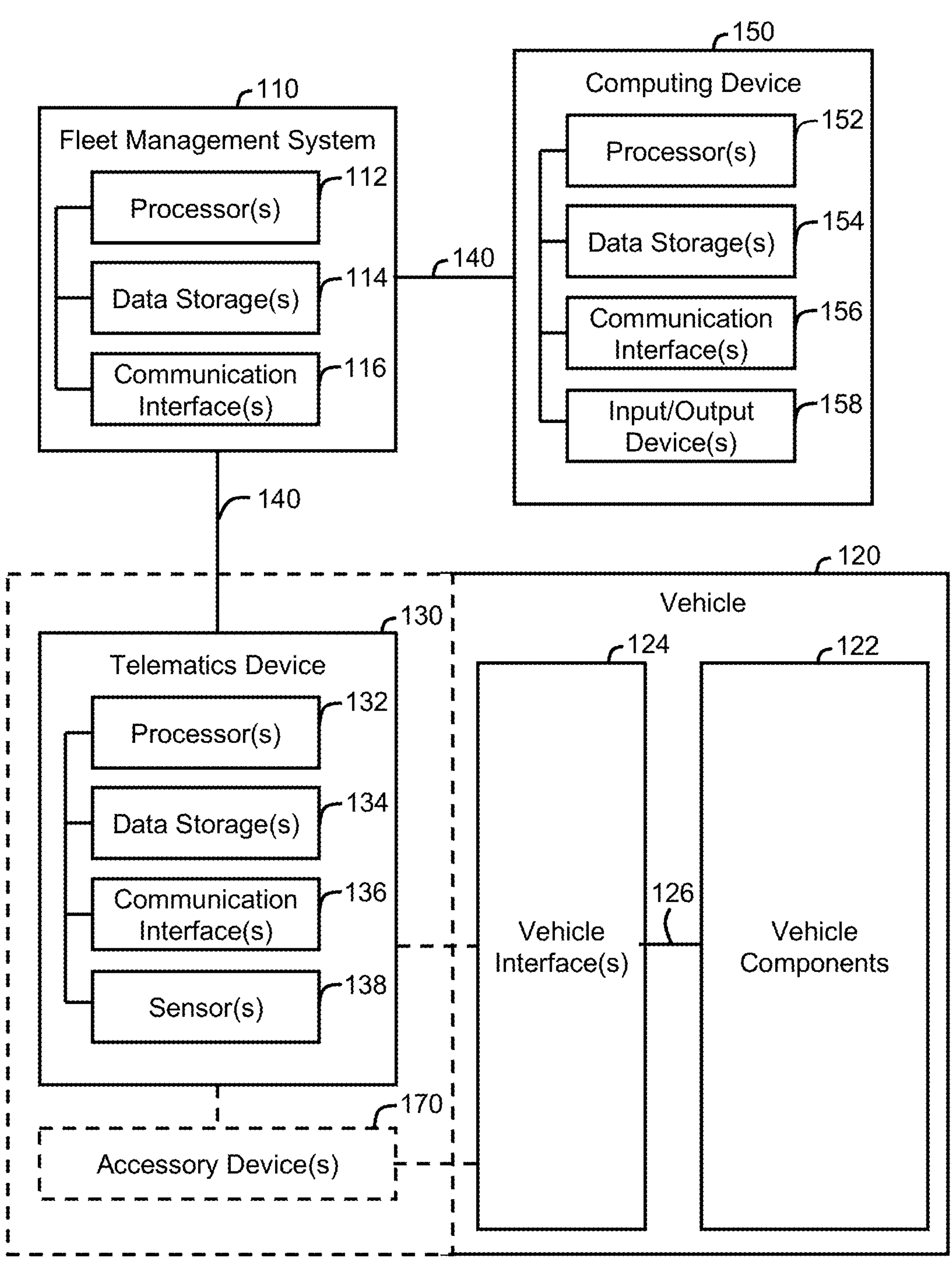
FIG. 2 is a block diagram of an example fleet management system interacting with an example computing device and an example telematics device that is monitoring an example vehicle, in accordance with an embodiment.

Reference will now be made to FIG. 2 to further explain the operation of the fleet management system 110, telematics devices 130, and computing devices 150. In the illustrated example, the asset management system 110 is in communication with a computing device 150 and a telematics device 130 that is monitoring a vehicle 120.

The fleet management system 110 can include one or more processors 112, one or more data storages 114, and one or more communication interfaces 116. Each of these components may communicate with each other. In some embodiments, two or more of these components may be distributed across a wide geographical area.

The processors 112 can control the operation of fleet asset management system 110. The processors 112 can be implemented using any suitable processing devices or systems, such as, but not limited to, CPUs (central processing units), GPUs (graphics processing units), FPGAS, (field programmable gate arrays), ASICs (application specific integrated circuits), DSPs (digital signal processors), NPUs (neural processing units), QPUs (quantum processing units), ISPs (image signal processors), microprocessors, and/or controllers. The processors 112 can execute various computer instructions, programs, and/or software stored on the data storages 114 to implement various methods described herein. For example, the processors 112 may process various telematics data collected by the fleet management system 110 from the telematics device 130.

The data storages 114 can store various data for the fleet management system 110. The data storages 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storages 114 may include volatile memory and/or non-volatile memory. The data storages 114 may include non-transitory computer readable media. The data storages 114 can store various computer instructions, programs, and/or software that can be executed by the processors 112 to implement various methods described herein. The data storages 114 may store various telematics data collected from the telematics device 130 and/or processed by the processors 112.

The communication interfaces 116 can enable communication between the fleet management system 110 and other devices or systems, such as the telematics device 130 through network 140. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130 and transmit telematics data to the computing device 150.

The telematics device 130 can include one or more processors 132, one or more data storages 134, and one or more communication interfaces 136, and one or more sensors 138. Each of these components may communicate with each other.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data storages 134. For example, the processors 132 can process various telematics data gathered from the vehicle 120 and/or the sensors 138.

The data storages 134 can store various data for the telematics device 130. Like the data storages 114 of the fleet management system 110, the data storages 134 of the telematics device 130 can be implemented using any suitable data storage devices or systems. The data storages 134 can store various computer instructions, programs, and/or software that can be executed by the processors 132. The data storages 134 can also store various telematics data gathered from the vehicle 120 and/or the sensors 138.

The communication interfaces 136 can enable communication between the telematics device 130 and other devices or systems, such as, but not limited to, the fleet management system 110 through network 140 and/or the vehicle 120. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle 120 and/or sensors 138 and send the telematics data to the fleet management system 110.

The sensors 138 can detect and/or measure various environmental events or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. The sensors 138 can be used to gather various telematics data that may not be directly obtainable from the vehicle 120. In some embodiments, the sensors 138 can include a satellite navigation device, such as, but not limited to, a GPS (global positioning system) receiver, which can measure the location of the vehicle 120. In some embodiments, the sensors 138 can include accelerometers, gyroscopes, magnetometers, and/or IMUs (inertial measurement units), which can measure the acceleration and/or orientation of the vehicle 120. In some embodiments, the sensors 138 can include one or more cameras, which can capture images of the vehicle 120 and/or the vehicle's 120 environment. The cameras can include various optical and/or electronic components that can manipulate light, convert light into electrical signals, and form digital images. For example, the cameras can include one or more image sensors that convert light into image data and one or more lenses that focus and regulate light onto the image sensors. In some embodiments, the cameras can include one or more actuators that move the lenses and/or image sensors to focus and/or stabilize the images. In some embodiments, the sensors 138 can include external sensors that are physically separated from the other components of the telematics device 130. For example, the external sensors may be positioned in different areas of the vehicle 120 than the processors 132, data storages 134, communication interfaces 136 and/or other sensors 138.

In some embodiments, the telematics device 130 is in communication with the vehicle 120 and collects telematics data directly from the vehicle 120 through one or more vehicle interfaces 124. For example, one or more communication interfaces 136 of the telematics device 130 can be connected to one or more vehicle interfaces 124 of the vehicle 120 to communicate with various vehicle components 122. The vehicle components 122 and vehicle interfaces 124 can be connected through one or more vehicle buses 126 (i.e., internal vehicle communication networks).

The vehicle interfaces 124 can facilitate communication between the vehicle components 122 and other devices or systems. The vehicle interfaces 124 can include any suitable communication devices or systems. For example, the vehicle interfaces 124 may include, but are not limited to, OBD-II (on-board diagnostics 2) ports, CAN (controller area network) bus connectors, proprietary or manufacturer-specific connectors, and/or commercial or heavy-duty diagnostics connectors (e.g., J1708, J1939). The vehicle buses 126 can employ any suitable communication protocol and utilize any communication medium, such as, but not limited to CAN (controller area network) and/or LIN, (local interconnect network). The vehicle components 122 can include any subsystems, parts, and/or subcomponents of the vehicle 120. For example, the vehicle components 122 can include, but are not limited to, powertrains, engines, transmissions, steering, braking, seating, batteries, doors, and/or suspensions. The vehicle components 122 can include one or more ECUs (electronic control units) that control the operation of the vehicle components 122 based on one or more internal vehicle sensors. The ECUs can transmit various data over the vehicle buses 126 which can be collected by the telematics device 130 as telematics data.

In some embodiments, the telematics device 130 is not in communication with the vehicle 120. That is, the telematics device 130 may solely collect telematics data from the sensors 138. In other words, the telematics device 130 may not acquire telematics data directly from the vehicle 120 in some embodiments. For example, the telematics device 130 may be an asset tracker or dashboard camera that is not in communication with the vehicle 120. In some embodiments, the telematics device 130 can collect telematics data from both the sensors 138 and the vehicle 120. For example, the telematics device 130 may be a vehicle tracking device that collects location and acceleration data from the sensors 138 and other vehicle data from the vehicle components 122.

In some embodiments, the telematics device 130 may operate in conjunction with one or more accessory devices 170 that are in communication with the telematics device 130. The accessory devices 170 can include various expansion devices that can provide additional functionality to the telematics device 130. For example, the accessory devices 170 may provide additional processing, storage, communication, and/or sensing functionality through one or more additional processors, data storages, communication interfaces, and/or sensors. The accessory devices 170 can be installed with the telematics device 130 at or near the vehicle 120. In some embodiments, the accessory devices 170 can include adapter devices that facilitate communication between the telematics device 130 and other devices, such as, but not limited to, cable or wire harnesses. In some embodiments, the accessory devices 170 can include output devices that can provide visual, audio, haptic, and/or other notifications to the driver of the vehicle 120. In some embodiments, the accessory devices 170 can include identification devices that can identify the driver of the vehicle 120. In some embodiments, the accessory devices 170 can include other telematics devices 130. In other words, a first telematics device 130 can be in communication with one or more other telematics devices to provide complimentary functionality. For example, a vehicle tracking device that gathers telematics data from the vehicle 120 may be in communication with a dashboard camera that acquires image data.

The computing device 150 can include one or more processors 152, one or more data storages 154, one or more communication interfaces 156, and one or more input and/or output devices 158. Each of these components can communicate with each other.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data storages 154 to implement various methods described herein. For example, the processors 152 may process various telematics data received from the fleet management system 110.

The data storages 154 can store various data for the computing device 150. Like the data storages 114 of the fleet management system 110 and the data storages 134 of the telematics device 130, the data storages 154 of the computing device 150 can be implemented using any suitable data storage devices or systems. The data storages 154 can store various computer instructions, programs, and/or software that can be executed by the processor 152 to implement various methods described herein. The data storages 154 may store various telematics data received from the fleet management system 110.

The communication interfaces 156 can enable communication between the computing device 150 and other devices or systems, such as the fleet management system 110 through network 140. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The input and/or output devices 158 can receive various inputs from the user 160 and/or provide various outputs to the user 160. For example, the input and/or output devices 158 may include, but are not limited to, displays, speakers, keyboards, mice, trackpads, touchscreens, microphones, and/or speakers. The input and/or output devices 158 can present various graphical user interfaces for various computer applications, programs, and/or software associated with various methods described herein. For example, the input and/or output devices 158 may display various visual representations of the telematics data. Likewise, the input and/or output devices 158 may receive various instructions to process the telematics data from the user 160.

Figure 3:
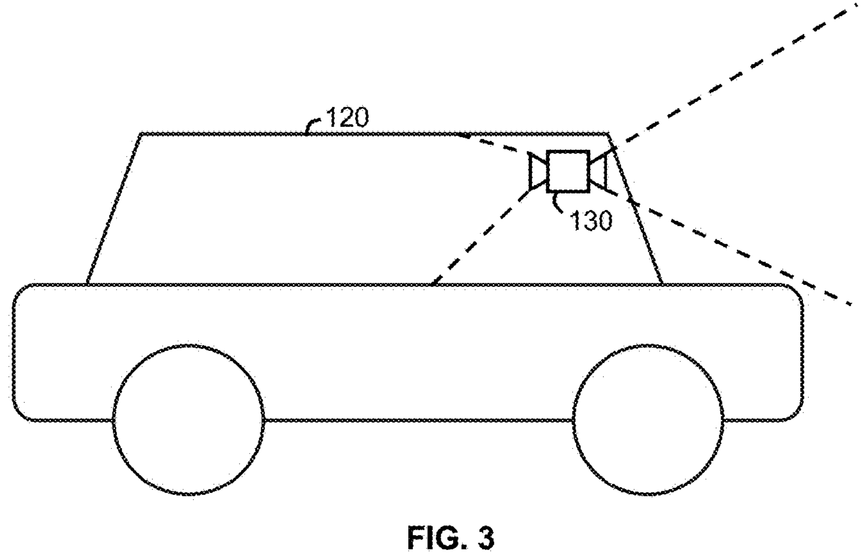
FIG. 3 is a side view of an example vehicle equipped with an example video telematics device, in accordance with an embodiment.

Referring now to FIG. 3, there is shown an example vehicle 120 equipped with an example telematics device 130. In the illustrated example, the telematics device 130 is an imaging device or video telematics device. In other words, the telematics device 130 includes one or more cameras that capture images associated with the vehicle 120. In the illustrated example, the onboard imaging device 130 is installed at the front windshield of the vehicle 120 and includes two cameras that can capture images of the interior of the vehicle 120 and the area in front of the vehicle 120. However, it should be appreciated that the imaging device 130 can include any number of cameras that can be installed in various locations to capture images from different perspectives or views. In some embodiments, one or more cameras can be positioned to capture images of the interior environment of the vehicle 120. For example, the imaging device 130 may be installed at the front windshield, rearview mirror, dashboard, and/or cabin ceiling. The interior images may depict various occupants (e.g., driver and/or passengers) and/or objects present in the cabin of the vehicle 120. In some embodiments, one or more cameras can be positioned to capture images of the exterior environment of the vehicle 120. For example, the imaging device 130 may be installed at the front windshield, rear windshield, front bumper, rear bumper, rear hatch, side mirrors, front grille, and/or roof. The exterior images can include images of an area in front of the vehicle 120, behind the vehicle 120, and/or to the side of the vehicle. The exterior images can depict various elements of the road and traffic environment surrounding the vehicle 120. In some embodiments, the imaging device 130 may be installed at an offboard, fixed location. In some embodiments, the imaging device 130 may be installed at or near a non-vehicle asset.

A problem associated with telematics devices 130, and in particular, imaging devices 130, is hardware capability. Telematics devices 130 can have limited processing and/or storage functionality due to various engineering and customer constraints, such as, but not limited to, size, power consumption, and/or cost. Telematics devices 130 often have size limitations because of installation location. For example, dashboard cameras need to be sufficiently small and discrete to avoid blocking or distracting the driver's view. This can limit the space available for computing hardware, thermal management, and energy storage. Telematics devices 130 can also have limited electrical power availability when deployed. For example, there may be limitations on how much electrical power a telematics device 130 can draw without depleting a device and/or vehicle battery. This can limit what computing hardware can be implemented in the telematics device 130. Telematics devices 130 can also have cost constraints dictated by market competition and customer acceptance. Hence, many telematics devices 130 employ less powerful computing hardware to decrease manufacturing cost.

Limited hardware capability can make it challenging for imaging devices 130 to process image data in real-time. Many imaging devices can produce large volumes of image data. For example, a typical 1-hour video having 1080p (1920×1080 progressively displayed pixels) resolution, 30 fps (frames per second) frame rate, and 5 Mbps (megabits per second) bitrate has a file size of approximately 2.25 GB (gigabytes). As a result, imaging devices 130 often lack the hardware capability to process the images they generate in real-time. However, real-time processing is a critically valuable functionality for imaging devices 130. For example, real-time processing can enable immediate event detection, alerting, and/or evidence preservation. Even small delays in processing may result in increased safety risks, data loss, and time to response. These challenges are further exacerbated as media file size and processing technique complexity continue to increase over time.

The inventors recognized and realized that these problems could be ameliorated by asynchronous processing images (i.e., performing “double takes”). In particular, the inventors recognized and realized that various subsets of images can be processed at different times by an imaging device to overcome its hardware limitations. For example, a first subset of images can be processed in substantially real-time (i.e., a “first take”). Thereafter, a second subset of images could be processed asynchronously, with a longer cumulative execution time (i.e., a “second take”). By strategically selecting the subsets of images, as well as how and where they are processed, the inventors recognized and realized that they could achieve substantially real-time processing while maintaining high predictive accuracy and precision. For example, the first subset of images could be selected to contain less image data (e.g., lower frame rate and/or lower resolution) than the second subset of images. Accordingly, the first subset of images could be rapidly processed in real-time, whereas the second subset of images could be later processed to confirm and/or augment the results of the first processing. The inventors further recognized and realized that the first subset of images could be processed on a different processor than the second subset of images. For example, the first subset of images may be processed by one or more processors better suited for real-time processing of a smaller datasets, such as, but not limited to, one or more GPUs and/or DSPs, whereas the second subset of images may be processed by one or more processors better suited for delayed processing of larger datasets, such as, but not limited to, one or more CPUs.

Figure 4:
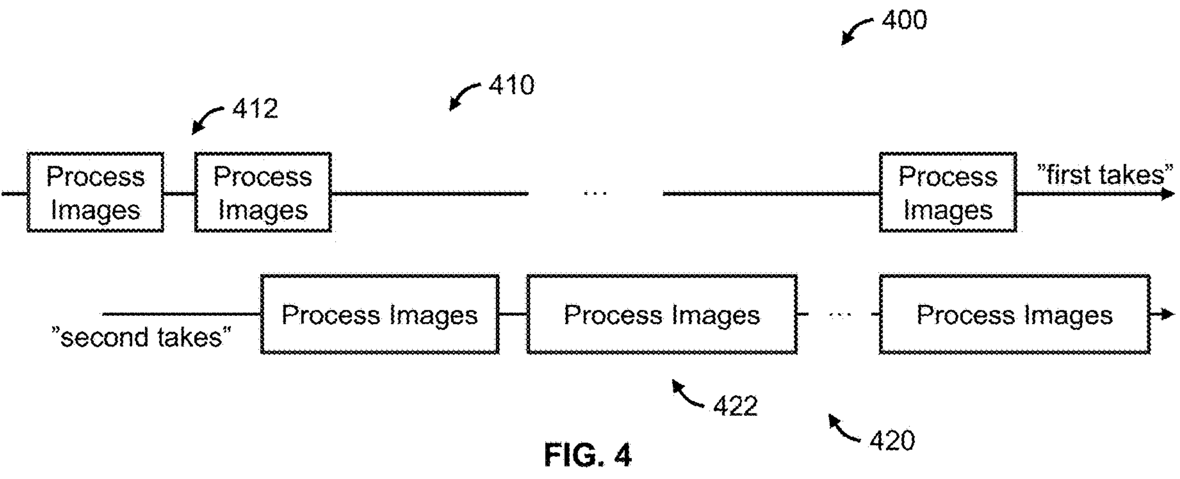
FIG. 4 is a block diagram of example asynchronous image processing queues, in accordance with an embodiment.

Referring to FIG. 4, there is shown example asynchronous image processing queues 400 that can be implemented by an imaging device 130. Each processing queue 400 can include a series of image processing tasks to be executed. Over time, the image processing tasks in each processing queue 400 can be sequentially executed. In the illustrated example, the processing tasks include processing various subsets of images captured by the imaging device 130 to detect events. The events can include any pertinent happenings, occurrences, and/or changes detectable from the images. For example, the events may include events associated with a vehicle 120 and/or a driver of the vehicle 120 at which the imaging device 130 is installed, such as, but not limited to, unsafe driving events. In some embodiments, the events can include unsafe vehicle maneuvers, such as, but not limited to, the vehicle 120 tailgating another vehicle, the vehicle 120 nearly colliding or colliding with another vehicle and/or other object, the vehicle 120 straddling two lanes, the vehicle 120 performing a rolling stop, and/or the vehicle 120 crossing a solid lane. In some embodiments, the events may include unsafe driver actions, such as, but not limited to, the driver drinking and/or eating, the driver not wearing a seatbelt, the driver using a phone, the driver smoking, the driver not viewing the road, and/or the driver yawning. In some embodiments, events can include events that are unrelated to a vehicle 120 and/or driver.

Processing a subset of images can involve executing one or more machine learning models. In particular, processing a subset of images can involve applying one or more machine learning models to the images to detect one or more events. The machine learning models can include any suitable machine learning models, such as, but not limited to, artificial neural networks, decision trees, support-vector machines, nearest neighbors, linear regression, logistical regression, Bayesian networks, random forests, genetic algorithms, and/or ensemble models. The models may be trained using supervised, unsupervised, semi-supervised, reinforcement, and/or other suitable learning. In general, the machine learning models can be any computer-implemented model that is trained to detect one or more events based on image data, without being explicitly programmed to do so.

In the illustrated example, the processing queues 400 include a first processing queue 410 (i.e., for performing “first takes”) and a second processing queue 420 (i.e., for performing “second takes”). The first processing queue 420 includes various image subsets 412 to be processed and the second processing queue includes corresponding image subsets 422 to be processed. Corresponding image subsets can include the same or different, but related, image data. For example, corresponding image subsets may be associated with the same event, be associated with one or more related events, and/or include images captured during the same or similar time period.

It should be appreciated that the first processing queue 410 is asynchronous with respect to the second processing queue 420. That is, image subsets 412 in the first processing queue 410 are processed at a different time than corresponding image subsets 422 in the second processing queue 420. In particular, image subsets 412 can be first processed in the first processing queue 410 at a first time and then corresponding image subsets 422 subsequently processed in the second processing queue 420 at a second time subsequent to the first time. Image subsets 412 in the first processing queue 410 can have a shorter processing time than corresponding image subsets 422 in the second processing queue 420. Image subsets 412 in the first processing queue 410 can be processed in substantially real-time with respect to capture of the respective images. Thereafter, corresponding image subsets 422 can then be processed in the second processing queue 420 subsequently and not in real-time. The second processing queue 420 can redetect the same event first detected in the first processing queue 410 to verify or confirm detection of the event and/or to detect one or more other events, which may or may not be related to the event. The same or different machine learning models can be used to process image subsets in first and second processing queues 410 and 420.

The image subsets 422 in the second processing queue 420 can have a longer processing time compared to corresponding image subsets 412 in the first processing queue 410 for various reasons. In some embodiments, image subsets 412 processed in the first processing queue 410 can include less image data than corresponding image subsets processed in the second processing queue 420. For example, image subsets 412 in the first processing queue 410 can include fewer images or images at a lower frame rate than corresponding image subsets 422 in the second processing queue 420. Additionally, or alternatively, image subsets 412 in the first processing queue 410 may include lower resolution images than corresponding image subsets 422 in the second processing queue 420. In some embodiments, processing image subsets 410 in the first processing queue 410 can involve applying fewer machine learning models to the images than processing corresponding image subsets 422 in the second processing queue 420. In some embodiments, processing image subsets 412 in the first processing queue 410 can involve applying smaller, less complex, and/or computationally-lighter machine learning models than processing corresponding image subsets 422 in the second processing queue 420. In some embodiments, the image subsets 422 in the second processing queue 420 can have the same or shorter processing time than corresponding image subsets 412 in the first processing queue 410.

The first and second processing queues 410 and 420 can be executed on different processors 132 to improve efficiency. For example, the second processing queue 420 can be executed by one or more primary processors and the first processing queue 410 can be executed by one or more coprocessors. The primary processors can include one or more general purpose processors, such as, but not limited to, CPUs, whereas the coprocessors can include one or more specialized processors that supplement the functions of the primary processors, such as, but not limited to, GPUs and/or DSPs. The primary processors can be more effective at executing larger and longer processing tasks not in real-time, whereas the coprocessors can be more effective at executing smaller and shorter processing tasks in real-time. In some embodiments, the first and second processing queues 410 and 420 can be executed on different processors of the same type. In some embodiments, the first and second processing queues 410 and 420 can be executed on the same one or more processors. In some embodiments, the first and second processing queues 410 and 420 can be executed on different cores of the same processor.

Figure 5:
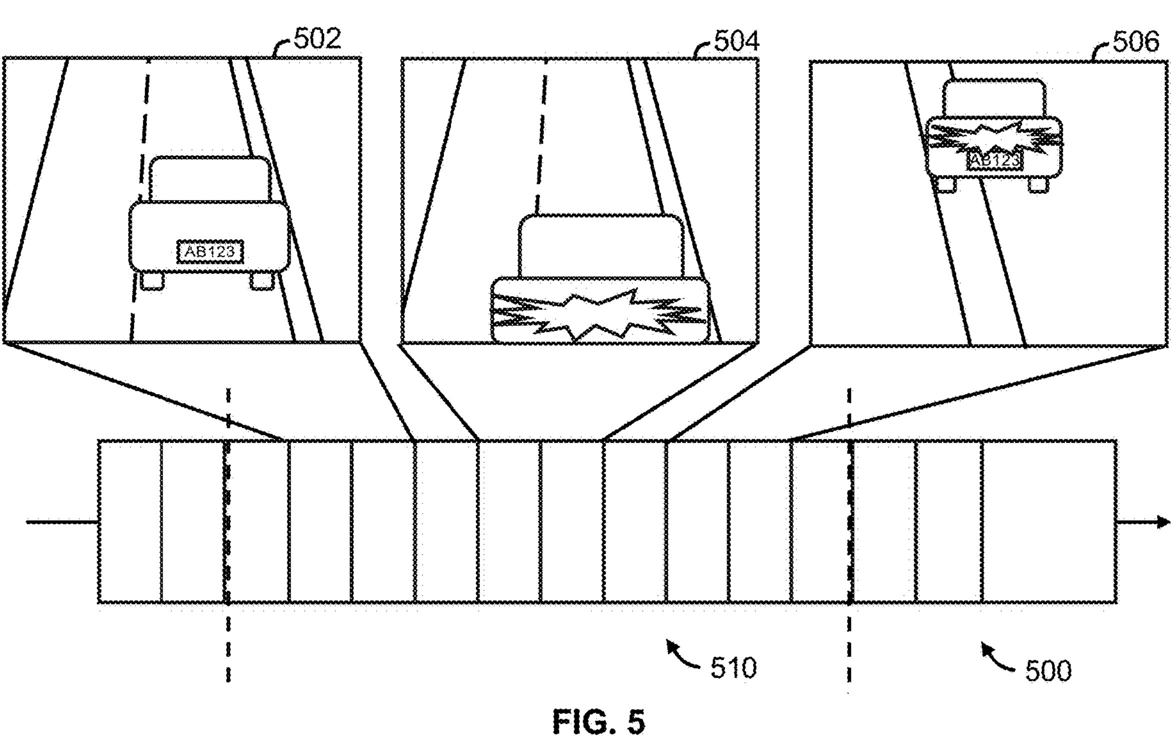
FIG. 5 is an example series of images of an area in front of a vehicle, in accordance with an embodiment.
Figure 6:
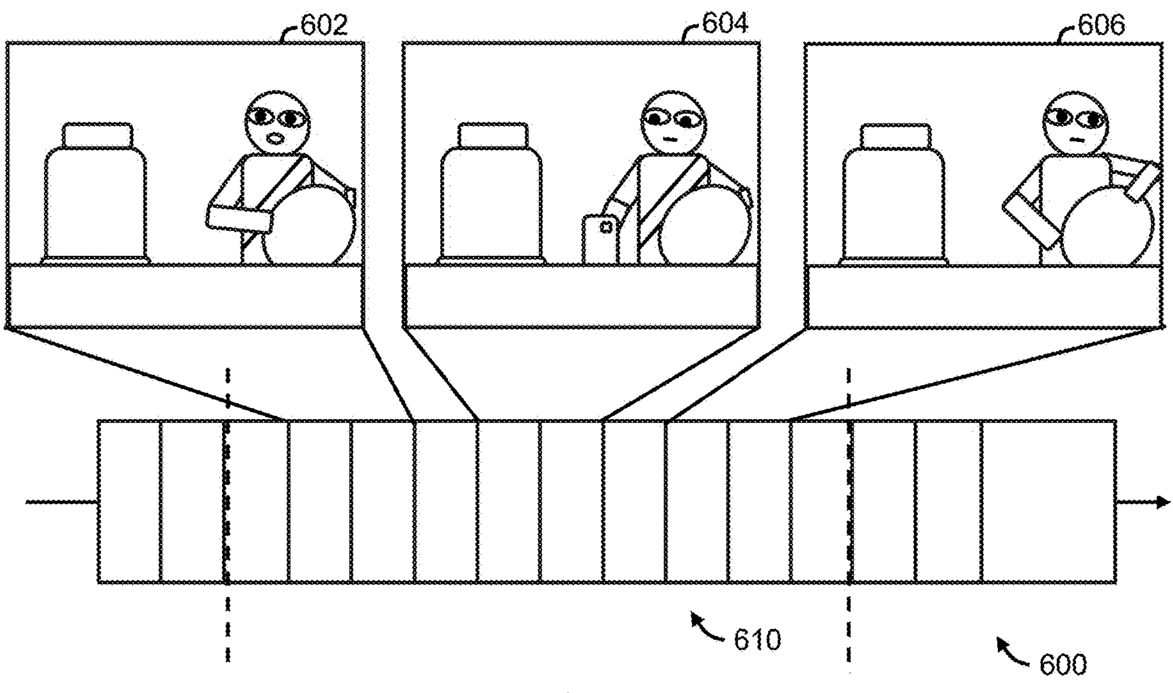
FIG. 6 is an example series of images of an interior of a vehicle, in accordance with an embodiment.

Referring now to FIGS. 5 and 6, there is shown example images that can be captured and processed by an imaging device 130 to detect events. FIG. 5 shows an example series of images 500 of an area in front of a vehicle 120 (e.g., captured by a road-facing camera) and FIG. 6 shows an example series of images of an interior of a vehicle 120 (e.g., captured by a driver-facing camera). In the illustrated example, an unsafe vehicle maneuver 510, the vehicle 120 colliding with another vehicle, can be detected in the images 500 of the area in front of the vehicle 120. Likewise, an unsafe driver action 610, the driver using a phone, can be detected in the images 600 of the interior of the vehicle 120. As described herein, one or more machine learning models can be applied to the images 500, 600 to detect the unsafe driving events. For example, the machine learning models can be applied to images captured before, during, and after the events 510, 610. However, there may be too much image data for the limited hardware of the imaging device 130 to comprehensively process in real-time. Instead, in accordance with the techniques described herein, subsets of the images 500, 600 can be selectively asynchronously processed using "double takes" to achieve substantially real-time detection in combination with subsequent validation and/or contextualization.

Figure 7:
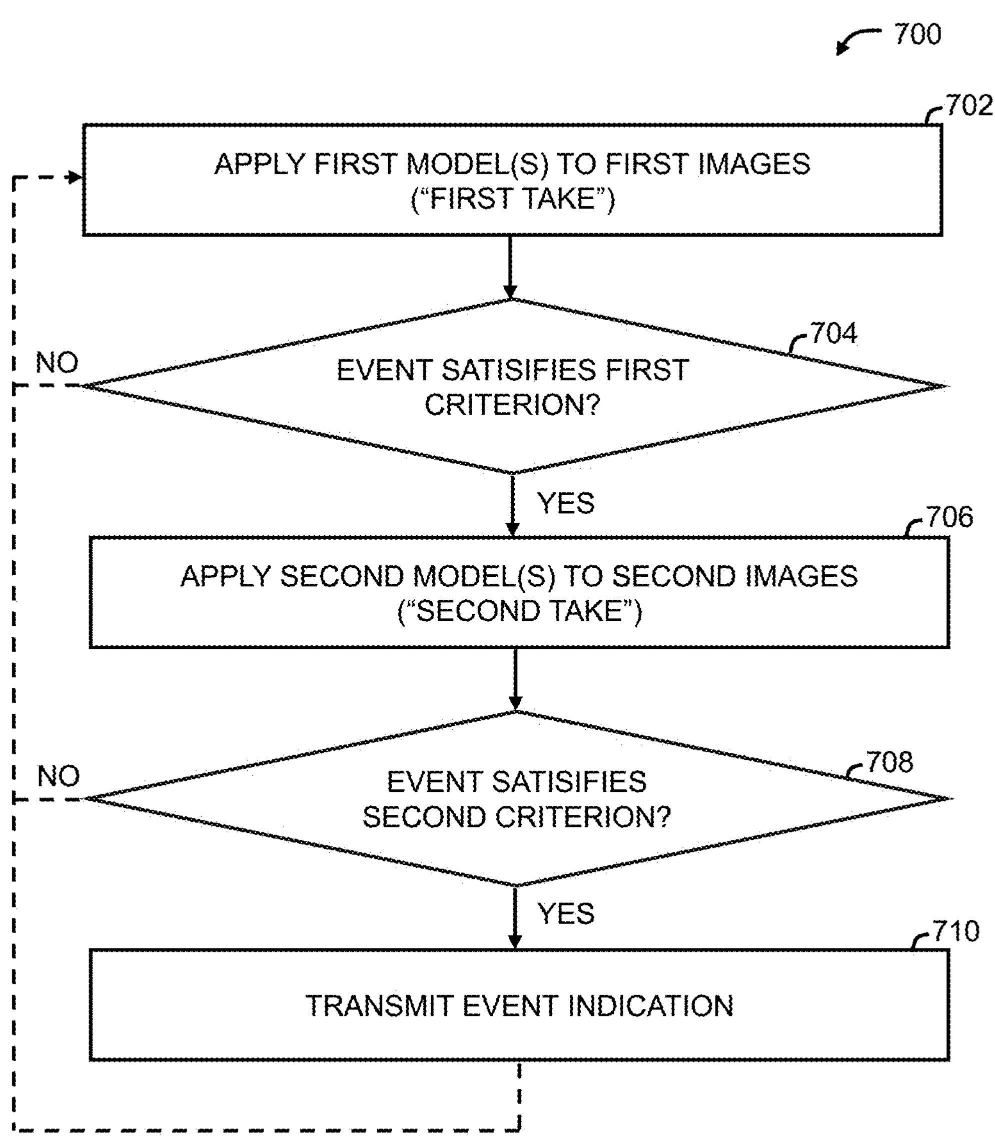
FIG. 7 is a flowchart of an example method for asynchronously processing image data, in accordance with an embodiment.

Referring to FIG. 7, there is shown an example method 700 for asynchronously processing image data (i.e., performing "double takes"). Image processing method 700 can be implemented by an imaging device 130 (e.g., by at least one processor 132 executing instructions stored on at least one data storage 134). The imaging device 130 can include at least one camera operable to capture images. The imaging device 130 can be installed at a vehicle 120. The images can depict an interior of the vehicle and/or an area in front of the vehicle. The images can have any suitable digital or computer file format, such as, but not limited to, JPEG (Joint Photographic Experts Group), PNG (Portable Network Graphics), GIF (Graphics Interchange Format), TIFF (Tagged Image File Format), and/or RAW. In some embodiments, the images can a series of images that form a digital video. For example, the images can be frames of a video. The video can have any suitable digital or computer file format, such as, but not limited to, MP4 (MPEG-4), MKV (Matroska), AVI (Audio Video Interleave), and/or MOV (QuickTime File Format). The video may be encoded using any suitable video coding format, such as, but not limited to, H.265/HEVC (High Efficiency Video Coding), H.264/AVC (Advanced Video Coding), and/or AV1 (AOMedia Video 1).

At 702, at least one first machine learning model can be applied to a first subset of images captured by at least one camera of the imaging device 130 (i.e., performing a "first take"). The at least one first machine learning model can detect an event and determine a first predicted probability of the event based on the first subset of the images.

The first subset of the images can include a portion of the images captured by the at least one camera of the imaging device 130. In other words, the first subset of the images can include some, but not all, of the images. The first subset of the images can include images associated with the event. For example, the first subset of the images may include images captured before, during, and/or after the event. The first subset of the images can exclude images not associated with the event. For example, the first subset of the images may exclude images captured more than a predetermined amount of time before or after the event. In some embodiments, the first subset of the images can include reduced, compressed, or downsampled versions of the original images. For example, the first subset of the images can have a lower resolution and/or frame rate than the original images. In some embodiments, image processing method 700 can involve, prior to 702, identifying the first subset of the images. Identifying the first subset of the images can involve temporally and/or spatially downsampling the images (e.g., by selectively selecting a portion of the images and/or pixels in the images) to generate the first subset of the images.

The at least one first machine learning model can include any suitable machine learning model trained to detect the event and determine a first predicted probability of the event based on the first subset of the images. For example, the at least one first machine learning model can include one or more artificial neural networks, decision trees, support-vector machines, nearest neighbors, linear regression, logistical regression, Bayesian networks, random forests, genetic algorithms, and/or ensemble models. The at least one machine learning model can be trained using supervised, unsupervised, semi-supervised, reinforcement, or any other suitable learning.

The event can be any pertinent happening, occurrence, or change detectable from the first subset of the images. For example, the event may be an event associated with a vehicle 120 and/or the driver of the vehicle 120 at which the imaging device 130 is installed, such as, but not limited to, an unsafe vehicle event. In some embodiments, the event can be an unsafe vehicle maneuver, such as, but not limited to, the vehicle 120 tailgating another vehicle, the vehicle 120 nearly colliding or colliding with another vehicle and/or other object, the vehicle 120 straddling two lanes, the vehicle 120 performing a rolling stop, and/or the vehicle 120 crossing a solid lane. In some embodiments, the event may be an unsafe driver action, such as, but not limited to, the driver drinking and/or eating, the driver not wearing a seatbelt, the driver using a phone, the driver smoking, the driver not viewing the road, and/or the driver yawning. In some embodiments, the event may be unrelated to a vehicle 120 and/or driver.

The first predicted probability of the event can represent an estimated likelihood of the event being present in the first subset of the images by the at least one first machine learning model. A high first predicted probability (e.g., 99%, 95%, 90%, 80%, 75%, 60%, etc.) can indicate that the at least one first machine learning model is confident that the event has occurred, whereas a low predicted probability (e.g., 50%, 40%, 25%, 10%, 5%, 1%, etc.) can indicate that the at least one first machine learning model is confident that the event did not occur, or is not confident that the event has occurred. For example, if the event is a driver using a phone, the first predicted probability may be high when a phone is present, the driver is holding the phone in a similar pose as example images the model was trained on, and there are minimal objects obstructing the view of the driver and/or phone. On the other hand, the first predicted probability may be low if the driver and/or phone is obstructed by other objects, the images are blurry, underexposed, or overexposed, or the driver is holding the phone in a different pose than the example images the model was trained on.

The at least one first machine learning model can be executed in substantially real-time with respect to the first subset of the images being captured. In other words, the execution of the at least one first machine learning model can be completed at a very high speeds, with minimal delay, lag, or latency with respect to the first subset of the images being captured. For example, the at least one first machine learning model may finish processing the first subset of the images within tens of seconds, seconds, or milliseconds of the images being captured. Hence, the event can be detected in real-time or very near real-time. As described herein, the first subset of the images can be selected to enable substantially real-time execution of the at least one first machine learning model. For example, the first subset of the images can have a lower resolution and/or frame rate than the original images to permit faster processing during the "first take". Likewise, the at least one first machine learning model can be run on hardware that allows for substantially real-time execution.

In some embodiments, the at least one first machine learning model can be executed on at least one coprocessor. The at least one coprocessor can be a specialized processor that supplements the functionality of one or more primary processors. For example, the at least one coprocessor can include at least one GPU and/or at least one DSP. The at least one specialized processor may be optimized to perform smaller, less complex tasks in parallel. Hence, the at least one specialized processor can be better suited to execute the at least one first machine learning model in substantially real-time.

At 704, it can be determined whether the first predicted probability of the event satisfies a first confidence criterion. If the first predicted probability of the event satisfies the first confidence criterion, image processing method 700 can proceed to 706 (i.e., to perform a "second take").

The first confidence criterion can be any suitable condition for triggering a "second take" at 706 (i.e., executing at least one second machine learning model). The first confidence criterion can vary depending on the type of event and desired detection sensitivity and specificity. A less strict first confidence criterion can reduce false negatives and positives at the cost of increased processing, whereas a stricter first confidence criterion can reduce processing at the cost of increased false negatives and positives. Hence, the first confidence criterion can be selected to balance the importance of correct detection the event versus the additional processing overhead of executing one or more second machine learning models to perform the "second take". In some embodiments, satisfying the first confidence criterion can involve meeting and/or exceeding a predetermined minimum threshold. For example, the first confidence criterion may be satisfied if the first predicted probability of the event is greater than 40%, 50%, 60%, 75%, 80%, 90%, 95%, etc. In some embodiments, satisfying the first confidence criterion can involve meeting and/or falling below a predetermined maximum threshold. For example, the first confidence criterion may be satisfied if the first predicted probability of the event is less than 50%, 50%, 75%, 80%, 90%, 95%, etc. In some embodiments, satisfying the first confidence criterion can involve falling within a predetermined range. For example, the first confidence criterion may be satisfied if the first predicted probability of the event is between 45 to 55%, 40 to 60%, 30 to 70%, 20% to 80%, etc.

At 706, at least one second machine learning model can be applied to a second subset of the images (i.e., to perform a "second take"). The at least one second machine learning model can detect the event and determine a second predicted probability of the event based on the second subset of the images.

The second subset of the images can also include images associated with the event. For example, the second subset of the images may also include images captured before, during, and/or after the event. In some embodiments, the second subset of the images can include more image data than the first subset of the images. For example, the second subset of the images can have a higher frame rate and/or higher resolution than the first subset of the images. In some embodiments, the second subset of the images can have a smaller resolution than the first subset of the images. For example, the second subset of the images can include a region of interest of the first subset of the images. In some embodiments, image processing method 700 can involve, prior to 706, identifying the second subset of the images. For example, the second subset of the images can be identified in response to determining that the first predicted probability of the event satisfies the first confidence criterion at 704. The second subset of the images can be identified from the images based on the first subset of the images. Identifying the second subset of the images may involve identifying additional images associated with but not in the first subset of the images. For example, identifying the second subset of the images can involve identifying the original images that were downsampled to create the first subset of the images. In some embodiments, identifying the second subset of the images can involve cropping a region of interest from the first subset of the images. In some embodiments, the first and second subset of the images can be the same. In some embodiments, the second subset of images can contain less image data than the first subset of the images.

The second predicted probability of the event can represent an estimated likelihood of the event being present in the second subset of the images by the at least one second machine learning model. A high second predicted probability (e.g., 99%, 95%, 90%, 80%, 75%, 60%, etc.) can indicate that the at least one second machine learning model is confident that the event has occurred, whereas a low predicted probability (e.g., 50%, 40%, 25%, 10%, 5%, 1%, etc.) can indicate that the at least one second machine learning model is confident that the event did not occur, or is not confident that the event has occurred.

The at least one second machine learning model can include any suitable machine learning model trained to detect the event and determine a second predicted probability of the event based on the second subset of the images. The at least one second machine learning model can also include one or more artificial neural networks, decision trees, support-vector machines, nearest neighbors, linear regression, logistical regression, Bayesian networks, random forests, genetic algorithms, and/or ensemble models, and can also be trained using supervised, unsupervised, semi-supervised, reinforcement, or any other suitable learning. The at least one second machine learning model can include the same and/or different machine learning models than the at least one first machine learning model. The at least one second machine learning model can include the same, greater, or fewer machine learning models than the at least one first machine learning model.

In some embodiments, the at least one second machine learning model may include at least one common machine learning model with the at least one first machine learning model. In other words, the at least one common machine learning model can be applied to both the first and second subsets of the images. Hence, one or more of the same machine learning models can be executed during both "first and second takes". Repeating execution of the at least one common machine learning model can allow the "second take" to confirm or validate the results of the "first take". This can reduce the risk of false positives and negatives (i.e., false detection of events that did not occur and missed detection of events that did occur).

In some embodiments, the at least one second machine learning model can include at least one larger, more complex, or computationally-heavier version of at least one first machine learning model. A higher complexity version of the at least one first machine learning model can have a more intricate architecture and/or a larger number of parameters than the at least one first machine learning model. Hence, higher complexity versions of the at least one first machine learning model can be used to confirm and/or verify the event with greater accuracy and/or precision than the at least one first machine learning model, using additional computational cost.

In some embodiments, the at least one second machine learning model can detect at least one other event that was not detected by the at least one first machine learning model. The at least one other event may or may not be related to the event. For example, if the event is an unsafe vehicle maneuver, the at least one other event may include at least one unsafe driver action. Likewise, if the event is an unsafe driver action, the at least one other event may include at least one unsafe vehicle maneuver. In some embodiments, the at least one second machine learning model may identify contextual data associated with the event, which may be considered another event. For example, if the event involves another vehicle 120, the contextual data may include the license plate, make, and/or model of the other vehicle 120. In some embodiments, the contextual data may include weather, road hazards, traffic signals, traffic signs, pedestrians, and/or other driving conditions.

In some embodiments, the at least one second machine learning model can be applied on at least one output of the at least one first machine learning model. For example, the at least one first machine learning model may identify a region of interest in the first subset of the images associated with the event. The region of interest may be used as an input by the at least one second machine learning model to reduce the search space of the at least one second machine learning model on the second subset of the images, which can improve efficiency and/or accuracy. Similarly, the at least one first machine learning model may identify a label associated with the event. The label can describe, indicate, or categorize the type of event detected. The label may be used as an input by the at least one second machine learning model to provide an initial prediction and/or to decide which machine learning models to apply, which may improve efficiency and/or accuracy.

The at least one second machine learning model (i.e., second take) can be executed asynchronously with respect to the at least one first machine learning model. In other words, the "first and second takes" can be executed at different times. In particular, the at least one first machine learning model (i.e., "first take") can be executed at a first time, and the at least one second machine learning model (i.e., "second take") can be executed at a second time subsequent to the first time. As described herein, the at least one first machine learning model (i.e., "first take") can be executed in substantially real-time. Thereafter, the at least one second machine learning model (i.e., "second take") can be executed subsequently and not in real-time. This can allow the at least one second machine learning model (i.e., "second take") to take additional time to confirm the event detection of the at least one first machine learning model (i.e., "first take") and/or provide additional event detection.

The application of the at least one second machine learning model can have a longer cumulative execution time that the application of the at least one first machine learning model. In other words, the execution of the at least one second machine learning model on the second subset of the images (i.e., "second take") can take longer to complete than the execution of the at least one first machine learning model on the first subset of the images (i.e., "first take"). In some embodiments, the longer cumulative execution time can be a consequence of the first subset of the images having less image data (e.g., lower resolution and/or lower frame rate) than the second subset of the images. In some embodiments, the longer cumulative execution time can be a consequence of at least one second machine learning model (i.e., "second take") having more machine learning models than the at least one first machine learning model (i.e., "first take"). In some embodiments, the at least one second machine learning models (i.e., "second take") can include larger, more complex, and/or computationally-heavier machine learning models than the at least one first machine learning model (i.e., "first take").

In some embodiments, the at least one second machine learning model (i.e., "second take" can be executed on a different processor than the at least one first machine learning model (i.e., "first take"). For example, the at least one first machine learning model may be executed on at least one first processor, whereas the at least one second machine learning model may be executed on at least one second processor. In some embodiments, the at least one second machine learning model may be executed on at least one primary processor, whereas the at least one first machine learning model may be executed on at least one coprocessor. The at least one primary processor can be more efficient at performing larger and/or more complex tasks than the at least one specialized processor. Hence, the at least one primary processor can be better suited to perform "second takes" asynchronously and with longer execution times. In some embodiments, the at least one primary processor can include at least one CPU. In some embodiments, the at least one second machine learning model and the at least one first machine learning model can be executed on the same one or more processors. In some embodiments, the at least one second machine learning model and the at least one first machine learning model can be executed on different cores of the same processor.

At 708, it can be determined whether the second predictive probability of the event satisfies a second confidence criterion. If the second predicted probability of the event satisfies the second confidence criterion, image processing method 700 can proceed to 710.

The second confidence criterion can be any suitable condition for confirming the detection of the event and triggering transmission of an indication thereof at 710. The second confidence criterion can be higher, the same, or lower than the first confidence criterion. The second confidence criterion can vary depending on the type of event and desired detection sensitivity and specificity. A less strict second confidence criterion can reduce false negatives at the cost of increased false positives, whereas a more strict second confidence criterion can reduce false positives at the cost of increased false negatives. Hence, the second confidence criterion can be selected to balance sensitivity/recall versus specificity/precision. In some embodiments, satisfying the second confidence criterion can involve meeting and/or exceeding a predetermined minimum threshold. For example, the second confidence criterion may be satisfied if the second predicted probability of the event is greater than 40%, 50%, 60%, 75%, 80%, 90%, 95%, 99% etc.

At 710, an indication of the event can be transmitted. For example, the indication of the event can be transmitted to the fleet management system 110 and/or at least one computing device 150. In some embodiments, the second subset of the images can also be transmitted. The indication of the event and/or the second subset of the images can be used to notify one or more users 160 remotely located from the imaging device 130.

The indication of the event can be any suitable data indicating the occurrence of the event. For example, the indication may be an event record, data log, data entry, status, flag, etc. The indication of the event can be stored in association with the second subset of the images. In some embodiments, the indication of the event can be a label. The label can describe, indicate, or categorize the type of event detected in the second subset of the images. The label can be generated in response to determining that the second predicted probability of the event satisfies the second confidence criterion at 708.

The indication of the event and/or the second subset of the images can be persistently stored to preserve evidence of the event. For example, the indication of the event and/or the second subset of the images can be stored at one or more data storages 114, 154 of the fleet management system 110 and/or one or more computing devices 150. The indication of the event and/or the second subset of the images may be stored to exonerate drivers, combat fraudulent claims, expedite insurance settlements, and/or implement driver coaching.

In some embodiments, one or more actions can automatically be triggered in response to receipt of the indication of the event and/or the second subset of the images. For example, one or more users 160 can be notified of the event. The users 160 can be notified using the indication of the event and/or the second subset of the images. In some embodiments, at least one user 160 that is remotely located from the imaging device 130 can be notified of the event. For example, the at least one user 160 may include, but is not limited to, a fleet manager of a fleet to which the vehicle 120 belongs, an insurance entity insuring the vehicle 120, emergency services in the geographical area the vehicle 120 is located, and/or roadside assistance services in the geographical area the vehicle 120. This can allow one or more users 160 to respond to the event, for example, mitigating the consequences of one or more unsafe driving events and/or preventing future unsafe driving events. In some embodiments, the at least one user 160 can be notified by a notification that is transmitted to at least one computing device 150 associated with the user 160. In some embodiments, the at least one user 160 can be notified by at least one report that is accessible through the at least one computing device 150.

In some embodiments, if at least one other event is detected by the at least one second machine learning model, an indication of the at least one other event can also be transmitted. The indication of the at least one other event can also be stored and/or used to trigger one or more automatic responses. In some embodiments, if contextual data is identified by the at least one second machine learning model, the contextual data can also be transmitted. The contextual data can also be stored and/or used to trigger one or more automatic responses.

In some embodiments, image processing method 700 can be repeated, iterated, or continuously executed. This can enable image processing method 700 to detect additional events of the same and/or different types. For example, after 710, image processing method 700 can proceed back to 702 (i.e., applying the at least one first machine learning model to another first subset of the images captured by the imaging device 130). Likewise, if the first predicted probability of the event is determined not to satisfy the first confidence criterion at 704, image processing method 700 can also proceed to back to 702. Similarly, if the second predicted probability of the event is determined to not satisfy the second confidence criterion at 708, image processing method 700 can also proceed back to 702.

Figure 8:
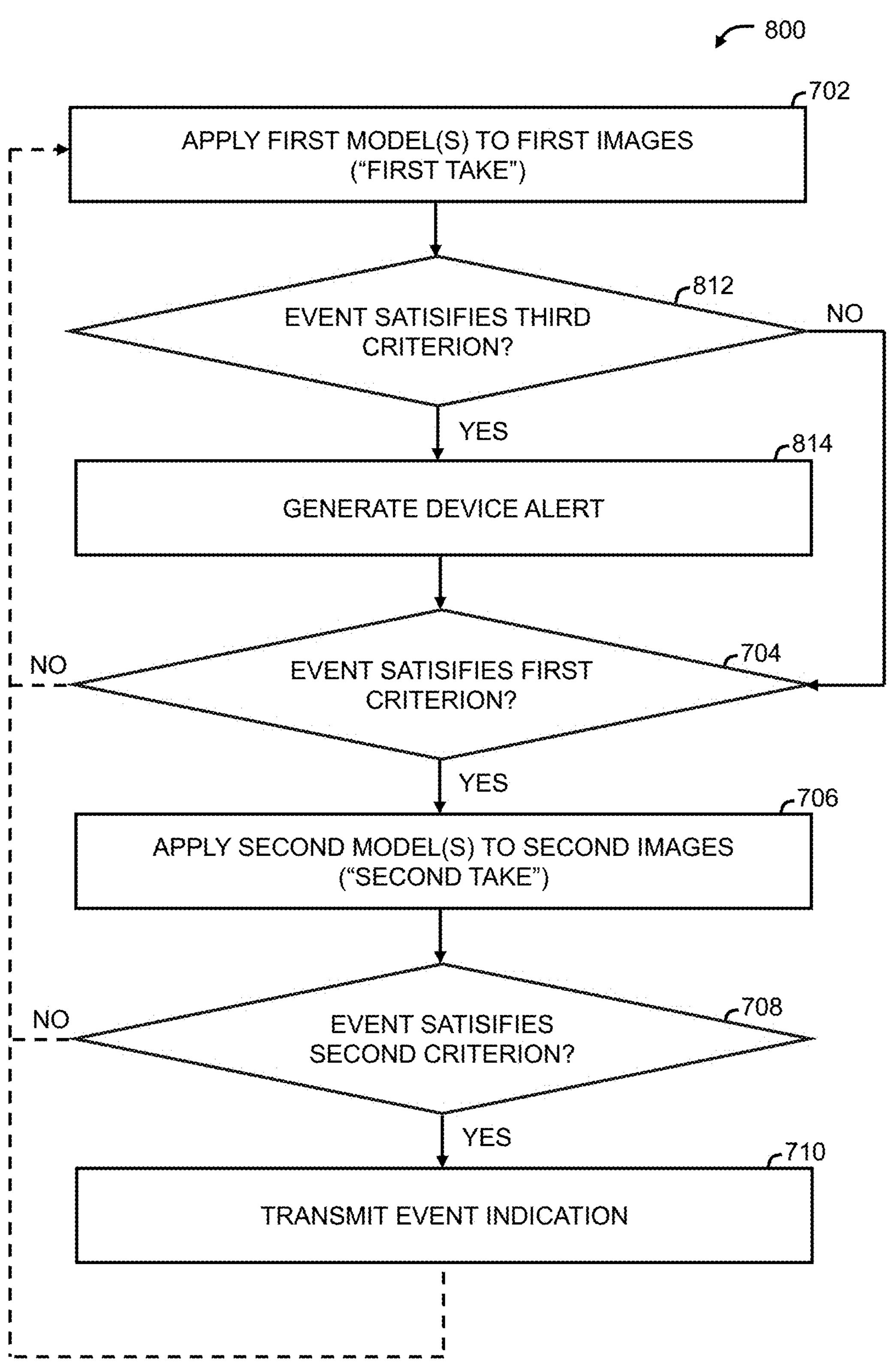
FIG. 8 is a flowchart of another example method for asynchronously processing image data, in accordance with an embodiment.

Referring to FIG. 8, there is shown another example method 800 for asynchronously processing image data (i.e., to perform "double takes"). Image processing method 800 can also be implemented by an imaging device 130 (e.g., by at least one processor 132 executing instructions stored on at least one data storage 134) that can include at least one camera operable to capture images. The imaging device 130 can be installed at a vehicle 120 and the images can depict an interior of the vehicle and/or an area in front of the vehicle. The images can have any suitable digital or computer file format and may be a series of images that form a digital video encoded using any suitable video coding format. Various acts of image processing method 800 that are the same as image processing method 700 are labeled with the same reference characters, and discussion of these features is abbreviated or omitted for brevity.

After 702, as previously described, image processing method 800 can proceed to 812. At 812, it can be determined whether the first predicted probability of the event satisfies a third confidence criterion. If the first predicted probability of the event satisfies the third confidence criterion, image processing method 800 can proceed to 814. If the first predicted probability of the event does not satisfy the third confidence criterion, image processing method 800 can proceed to 704, as previously described.

The third confidence criterion can be any suitable condition for triggering an alert at the imaging device at 814. The third confidence criterion can vary depending on the type of event and desired sensitivity and specificity. A less strict third confidence criterion can reduce missed alerts at the cost of increased false alerts, whereas a stricter third confidence criterion may reduce false alerts at the cost of increased missed alerts. False alerts can cause alert fatigue, for example, as drivers become desensitized to alerts and begin to ignore alerts. On the other hand, missed alerts can prevent correctable unsafe driving events from being corrected. The third confidence criterion can be selected to strike the appropriate balance of sensitivity/recall and specificity/precision for each type of event. In some embodiments, satisfying the third confidence criterion can involve meeting and/or exceeding a predetermined minimum threshold. For example, the third confidence criterion may be satisfied if the first predicted probability of the event is greater than 90%, 95%, 99% etc.

The third confidence criterion may be selected in relation to the first and/or second confidence criteria. In some embodiments, the third confidence criterion can be stricter than the first confidence criterion. In other words, a higher confidence level may be required to trigger a device alert than to perform a "second take". This can decrease initial false alerts and alert fatigue, while ensuring that event detection is subsequently verified. In some embodiments, the third confidence criterion can be less strict than the second confidence criterion. In other words, the level of confidence required to trigger the device alert may be less than the level of confidence required to confirm detection of the event. This may decrease initial false alerts, while ensuring strict subsequent event verification. In some embodiments, the third confidence criterion can be the same as the second confidence criterion. In other words, the same level of confidence may be required to trigger the device alert and to confirm the event. This may decrease missed alerts, while ensuring strict subsequent event verification.

At 814 an alert can be generated at the imaging device 130. The alert can be any suitable warning, notification, cue, and/or signal of the event. For example, the alert can notify the driver of the vehicle 120 at which the imaging device 130 is installed of an unsafe driving event. The alert may be an auditory, visual, and/or haptic. For example, the alert may involve playing one or more sounds on one or more loudspeaker of the imaging device 130, illuminating one or more lights of the imaging device 130, and/or actuating one or more vibrators of the imaging device. In some embodiments, the alert can verbally announce the event, for example, vocalizing, "keep inside the lane", "eyes on the road", "collision", etc. Since the alert is generated in response to the at least one first machine learning model, the alert can also be generated in substantially real-time. The substantially real-time alerts can provide drivers with the opportunity to correct unsafe driving events as they occur.

After 814, image processing method 800 can proceed to 704, as described previously with respect to image processing method 700. Image processing method 800 can be repeated, iterated, or continuously executed as previously described.

Figure 9:
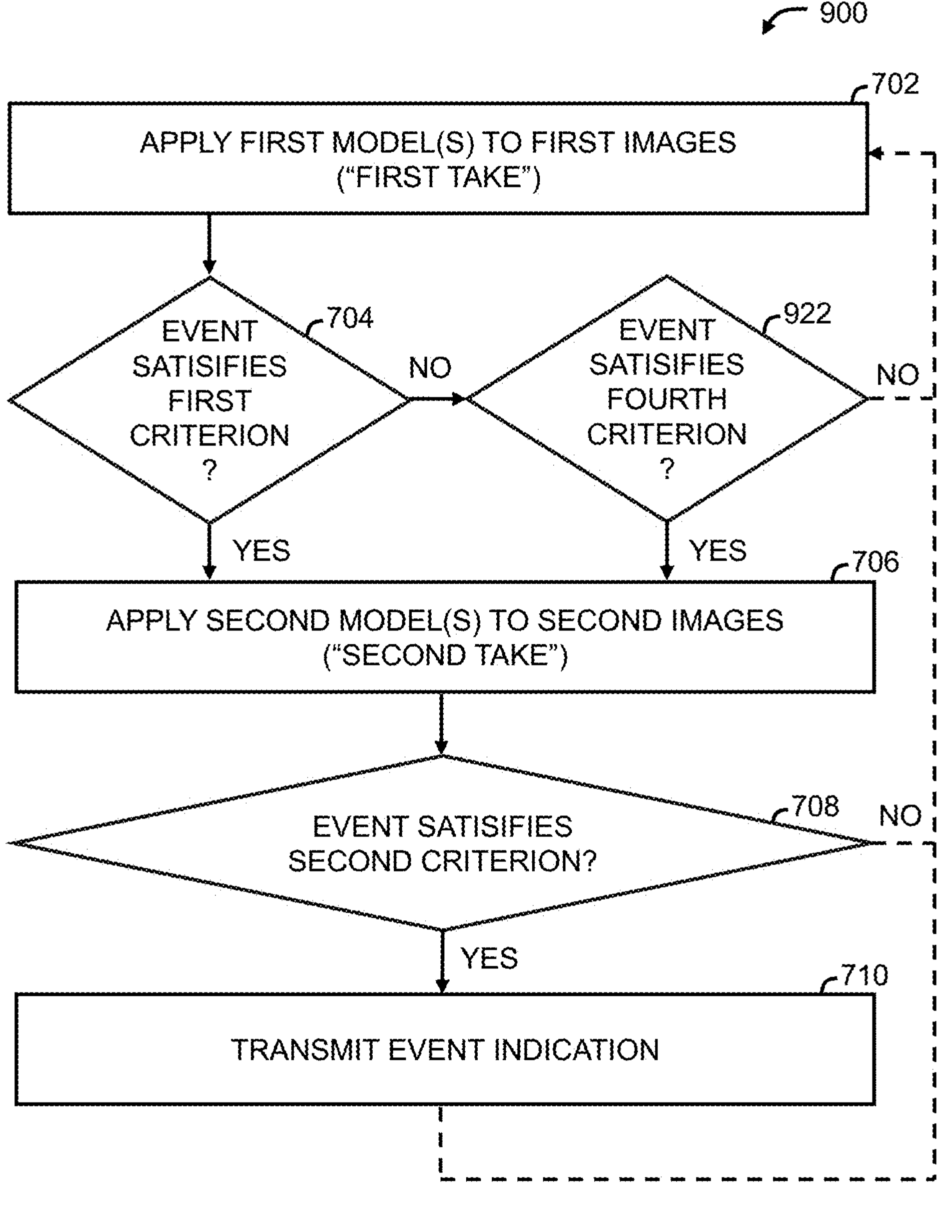
FIG. 9 is a flowchart of another example method for asynchronously processing image data, in accordance with an embodiment.

Referring to FIG. 9, there is shown another example method 900 for asynchronously processing image data (i.e., to perform "double takes"). Image processing method 900 can also be implemented by an imaging device 130 (e.g., by at least one processor 132 executing instructions stored on at least one data storage 134) that can include at least one camera operable to capture images. The imaging device 130 can be installed at a vehicle 120 and the images can depict an interior of the vehicle and/or an area in front of the vehicle. The images can have any suitable digital or computer file format and may be a series of images that form a digital video encoded using any suitable video coding format. Various acts of image processing method 900 that are the same as image processing method 700 are labeled with the same reference characters, and discussion of these features is abbreviated or omitted for brevity.

After 702, image processing method 900 can proceed to 704, as previously described. If the first predicted probability of the event satisfies the first confidence criterion, image processing method 900 can proceed to 706, as previously described. However, if the first predicted probability of the event does not satisfy the first confidence criterion at 704, image processing method can proceed to 922.

At 922, it can be determined whether a fourth confidence criterion is satisfied. The fourth confidence criterion can be any suitable condition for triggering a "second take", despite the first confidence criterion not being satisfied. The fourth confidence criterion can help reduce potential false negatives by providing an additional and alternative criterion for performing a "second take". In some embodiments, the fourth confidence criterion can be based on telematics data, such as, but not limited to, acceleration data and/or location data. The telematics data can indicate an elevated risk of an unsafe driving event. For example, the fourth confidence criterion can include whether the vehicle 120 is located within a predetermined area, such as, but not limited to an intersection, parking lot, highway, neighborhood, etc. Likewise, the fourth confidence criterion may include whether the vehicle's acceleration in one or more directions meets and/or exceeds a predetermined threshold, for example, indicating harsh acceleration, harsh braking, and/or harsh cornering. The fourth confidence criterion can vary based on the type of event and desired sensitivity and specificity. For example, vehicle intersection presence may be used as the fourth confidence criterion for performing "second takes" on rolling stops, whereas deacceleration magnitude and/or duration in one or more directions may be used as the fourth confidence criterion for performing "second takes" on collisions.

If the fourth confidence criterion is satisfied, image processing method 900 can proceed to 706 (i.e., to perform the "second take"), as previously described. If the fourth confidence criterion is not satisfied, image processing method 900 may proceed back to 702 (i.e., to perform another "first take"), as previously described. Image processing method 900 can be repeated, iterated, or continuously executed as previously described. It should be appreciated that various combinations and/or variations of image processing methods 900, 800, and 700 are possible. In some embodiments, one or more acts may be added, removed, substituted, and/or reordered.

Figure 10:
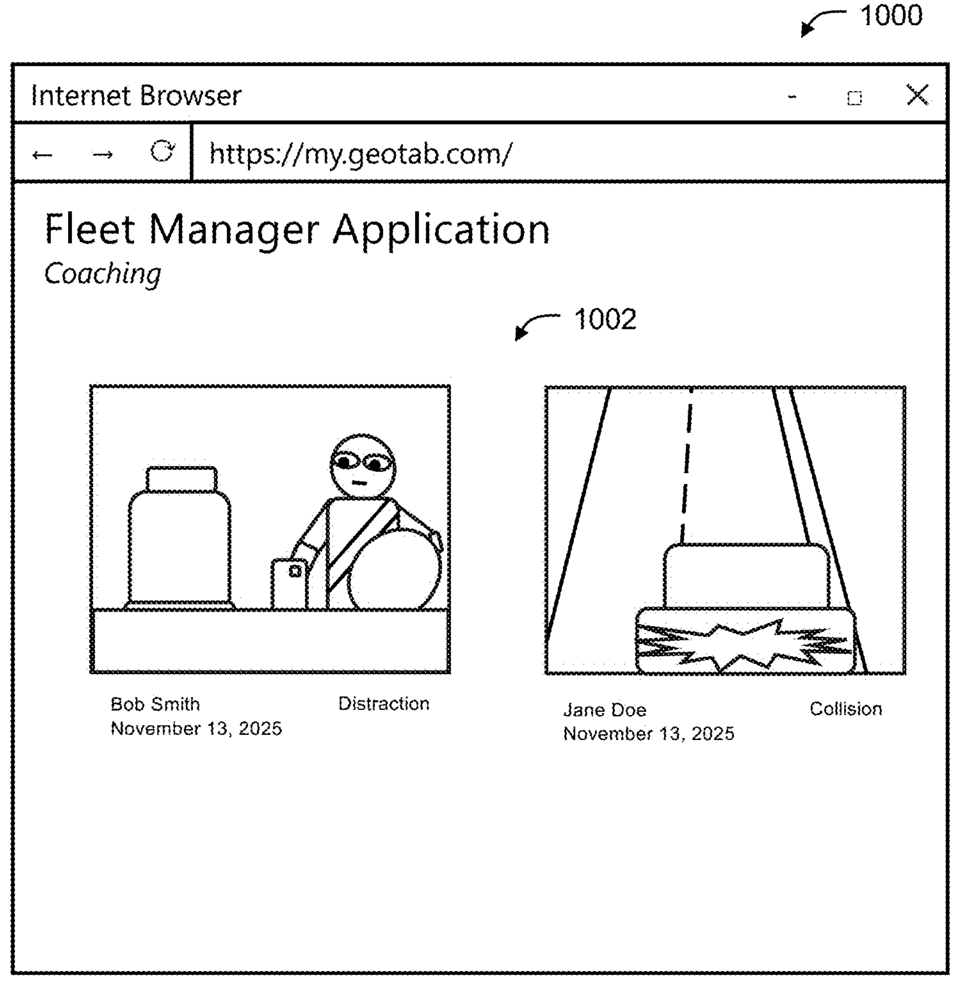
FIG. 10 is a screenshot of an example graphical user interface, in accordance with an embodiment.

FIG. 10 shows an example graphical user interface 1000. The graphical user interface 1000 can be executed and presented at a computing device 150, for example, using an output device 158. The graphical user interface 1000 can notify a user 160 of various events 1002 detected at an imaging device 130, for example, in response to 710. The graphical user interface 1000 can present various information related to the events 1002, including, but not limited to, the type of event, the time at which the events occurred, the number of occurrences of the event, people involved with the event, assets involved with the event, etc. The graphical user interface 1000 can also display images associated with the event. In the illustrated example, a user 160 can select an event 1002 to play a video of the event. This can allow a fleet manager to review events 1002 and respond to them. For example, the fleet manager may review one or more unsafe driving events and provide driver feedback and/or coaching to address critical risks and improve fleet safety. Although the graphical user interface 1000 in the illustrated example is implemented on a browser-based web application, it should be appreciated the graphical user interface may be implemented on other types of applications, such as, but not limited to, mobile applications, native desktop applications, etc.

Figures 11, 12, 13:
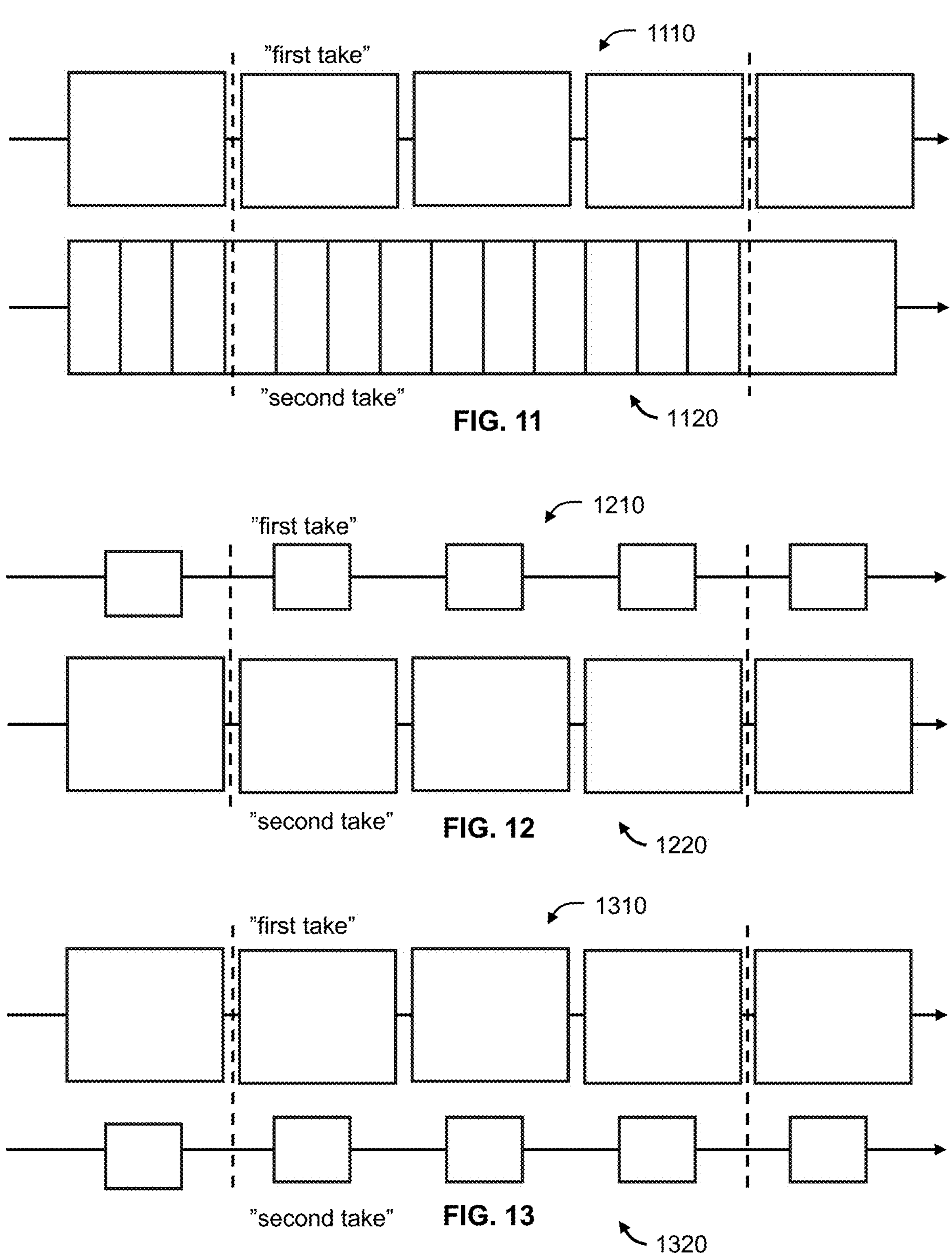
FIGS. 11 to 13 are example subsets of images, in accordance with an embodiment.

FIGS. 11, 12, and 13 show example subsets of images that can be asynchronously processed to perform "first and second takes". FIG. 10 shows an example in which the first subset of images 1110 has a lower frame rate than the second subset of images 1120. Put another way, the first subset of images 1110 contains fewer images than the second subset of images 1120. As such, the first subset of images 1110 contains less image data than the second subset of images 1120. FIG. 12 shows an example in which the first subset of images 1210 has a lower resolution than the second subset of images 1220. That is each image in the first subset of images 1210 can contain fewer pixels than the second subset of images 1220. As such, the first subset of images 1210 contains less image data than the second subset of images 1220. FIG. 13 shows an example in which the first subset of images 1310 has a higher resolution than the second subset of images 1320. For example, each image in the second subset of images 1320 may be a region of interest of an image in the first subset of images 1330. In the illustrated example, the first subset of images 1310 contains less image data than the second subset of images 1320. However, in some embodiments, the first subset of images 1310 can nevertheless contain less data than the second subset of images 1320, for example, when the first subset of images 1310 also has a lower frame rate than the second subset of images 1320.

Figure 14:
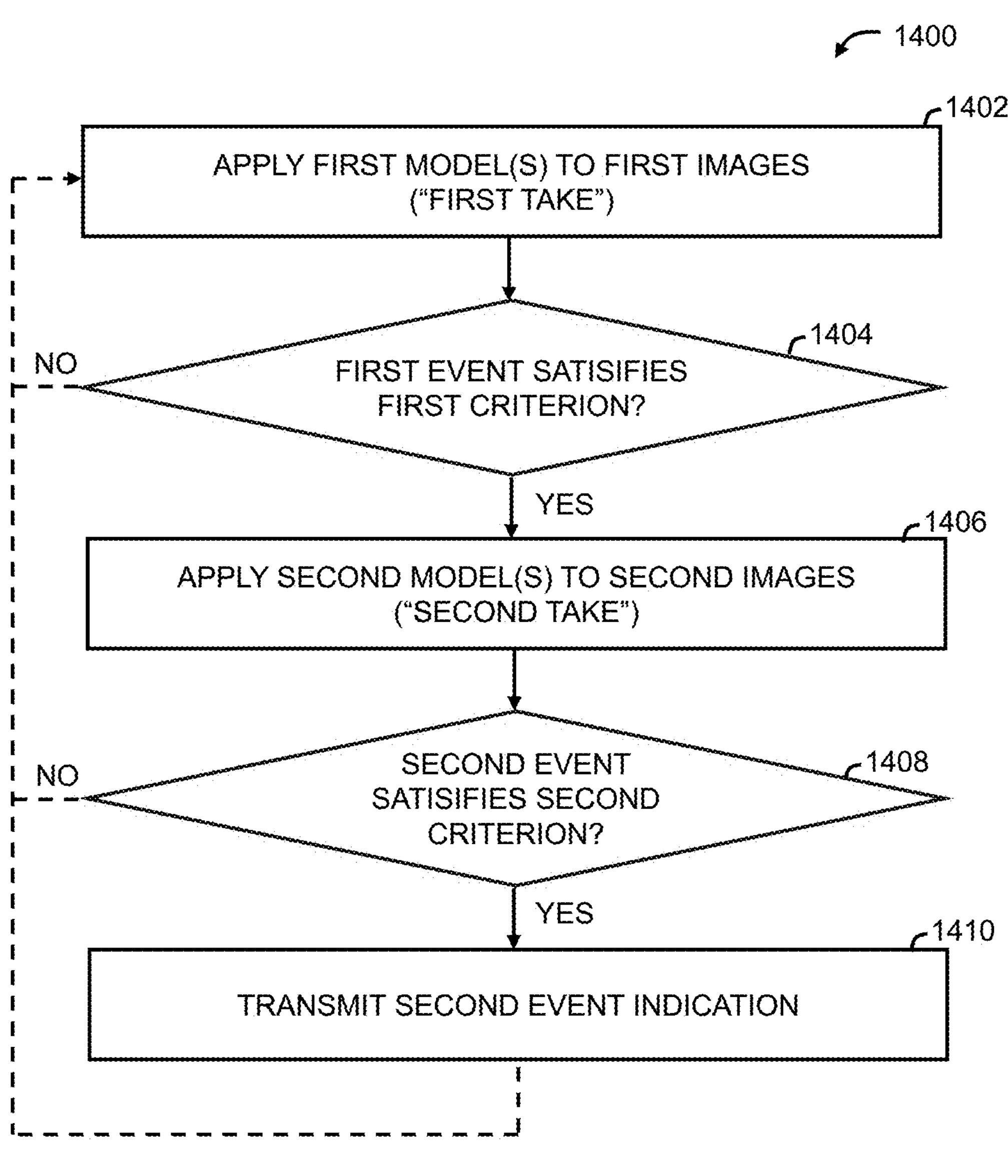
FIG. 14 is a flowchart of another example method for asynchronously processing image data, in accordance with an embodiment.

Referring to FIG. 14, there is shown another example method for method 1400 for asynchronously processing image data (i.e., to perform "double takes"). Image processing method 1400 can also be implemented by an imaging device 130 (e.g., by at least one processor 132 executing instructions stored on at least one data storage 134) that can include at least one camera operable to capture images. The imaging device 130 can be installed at a vehicle 120 and the images can depict an interior of the vehicle and/or an area in front of the vehicle. The images can have any suitable digital or computer file format and may be a series of images that form a digital video encoded using any suitable video coding format.

At 1402, at least one first machine learning model can be applied to a first subset of images captured by at least one camera of the imaging device 130 (i.e., performing a "first take"). The at least one first machine learning model can detect a first event and determine a predicted probability of the first event based on the first subset of the images.

The first subset of the images can include a portion of the images captured by the at least one camera of the imaging device 130. In other words, the first subset of the images can include some, but not all, of the images. The first subset of the images can include images associated with the first event. For example, the first subset of the images may include images captured before, during, and/or after the first event. The first subset of the images can exclude images not associated with the first event. For example, the first subset of the images may exclude images captured more than a predetermined amount of time before or after the first event. In some embodiments, the first subset of the images can include reduced, compressed, or downsampled versions of the original images. For example, the first subset of the images can have a lower resolution and/or frame rate than the original images. In some embodiments, image processing method 1400 can involve, prior to 1402, identifying the first subset of the images. Identifying the first subset of the images can involve temporally and/or spatially downsampling the images (e.g., by selectively selecting a portion of the images and/or pixels in the images) to generate the first subset of the images.

The at least one first machine learning model can include any suitable machine learning model trained to detect the first event and determine a predicted probability of the first event based on the first subset of the images. For example, the at least one first machine learning model can include one or more artificial neural networks, decision trees, support-vector machines, nearest neighbors, linear regression, logistical regression, Bayesian networks, random forests, genetic algorithms, and/or ensemble models. The at least one machine learning model can be trained using supervised, unsupervised, semi-supervised, reinforcement, or any other suitable learning.

The first event can be any pertinent happening, occurrence, or change detectable from the first subset of the images. For example, the first event may be an event associated with a vehicle 120 and/or the driver of the vehicle 120 at which the imaging device 130 is installed, such as, but not limited to, an unsafe vehicle event. In some embodiments, the first event can be an unsafe vehicle maneuver, such as, but not limited to, the vehicle 120 tailgating another vehicle, the vehicle 120 nearly colliding or colliding with another vehicle and/or other object, the vehicle 120 straddling two lanes, the vehicle 120 performing a rolling stop, and/or the vehicle 120 crossing a solid lane. In some embodiments, the first event may be an unsafe driver action, such as, but not limited to, the driver drinking and/or eating, the driver not wearing a seatbelt, the driver using a phone, the driver smoking, the driver not viewing the road, and/or the driver yawning. In some embodiments, the first event may be unrelated to a vehicle 120 and/or driver.

The predicted probability of the first event can represent an estimated likelihood of the first event being present in the first subset of the images by the at least one first machine learning model. A high first predicted probability (e.g., 99%, 95%, 90%, 80%, 75%, 60%, etc.) can indicate that the at least one first machine learning model is confident that the first event has occurred, whereas a low predicted probability (e.g., 50%, 40%, 25%, 10%, 5%, 1%, etc.) can indicate that the at least one first machine learning model is confident that the first event did not occur, or is not confident that the first event has occurred. For example, if the first event is a driver using a phone, the predicted probability may be high when a phone is present, the driver is holding the phone in a similar pose as example images the model was trained on, and there are minimal objects obstructing the view of the driver and/or phone. On the other hand, the predicted probability may be low if the driver and/or phone is obstructed by other objects, the images are blurry, underexposed, or overexposed, or the driver is holding the phone in a different pose than the example images the model was trained on.

The at least one first machine learning model can be executed in substantially real-time with respect to the first subset of the images being captured. In other words, the execution of the at least one first machine learning model can be completed at a very high speeds, with minimal delay, lag, or latency with respect to the first subset of the images being captured. For example, the at least one first machine learning model may finish processing the first subset of the images within tens of seconds, seconds, or milliseconds of the images being captured. Hence, the first event can be detected in real-time or very near real-time. As described herein, the first subset of the images can be selected to enable substantially real-time execution of the at least one first machine learning model. For example, the first subset of the images can have a lower resolution and/or frame rate than the original images to permit faster processing during the "first take". Likewise, the at least one first machine learning model can be run on hardware that allows for substantially real-time execution.

In some embodiments, the at least one first machine learning model can be executed on at least one coprocessor.

The at least one coprocessor can be a specialized processor that supplements the functionality of one or more primary processors. For example, the at least one coprocessor can include at least one GPU and/or at least one DSP. The at least one specialized processor may be optimized to perform smaller, less complex tasks in parallel. Hence, the at least one specialized processor can be better suited to execute the at least one first machine learning model in substantially real-time.

At 1404, it can be determined whether the predicted probability of the first event satisfies a first confidence criterion. If the predicted probability of the first event satisfies the first confidence criterion, image processing method 1400 can proceed to 1406 (i.e., to perform a "second take").

The first confidence criterion can be any suitable condition for confirming the occurrence of the first event, which can trigger performing "second take" at 1406 (i.e., executing at least one second machine learning model). The first confidence criterion can vary depending on the type of event and desired detection sensitivity and specificity. A less strict first confidence criterion can reduce false negatives at the cost of increased false positives, whereas a more strict first confidence criterion can reduce false positives at the cost of increased false negatives. Hence, the first confidence criterion can be selected to balance sensitivity/recall versus specificity/precision. In some embodiments, satisfying the first confidence criterion can involve meeting and/or exceeding a predetermined minimum threshold. For example, the first confidence criterion may be satisfied if the predicted probability of the first event is greater than 40%, 50%, 60%, 75%, 80%, 90%, 95%, 99% etc.

In some embodiments, an alert can be generated at the imaging device 130 if the predicted probability of the first event is determined to satisfy the first confidence criterion. The alert can be any suitable warning, notification, cue, and/or signal of the first event. For example, the alert can notify the driver of the vehicle 120 at which the imaging device 130 is installed of an unsafe driving event. The alert may be an auditory, visual, and/or haptic. For example, the alert may involve playing one or more sounds on one or more loudspeaker of the imaging device 130, illuminating one or more lights of the imaging device 130, and/or actuating one or more vibrators of the imaging device. In some embodiments, the alert can verbally announce the first event, for example, vocalizing, "keep inside the lane", "eyes on the road", "collision", etc. Since the alert is generated in response to the at least one first machine learning model, the alert can also be generated in substantially real-time. The substantially real-time alerts can provide drivers with the opportunity to correct unsafe driving events as they occur.

In some embodiments an indication of the first event can be transmitted in response to determining that the predicted probability of the first event satisfies the first confidence criterion. For example, an indication of the first event can be transmitted to the fleet management system 110 and/or at least one computing device 150. The indication of the first event can be used to notify one or more users 160 remotely located from the imaging device 130. In some embodiments, the first subset of images can also be transmitted, which can also be used to notify one or more users 160.

The indication of the first event can be any suitable data indicating the occurrence of the first event. For example, the indication may be an event record, data log, data entry, status, flag, etc. The indication of the first event may be stored in association with the first subset of the images. In some embodiments, the indication of the first event can be a label. The label can describe, indicate, or categorize the type of event detected in the first subset of the images. The label can be generated in response to determining that the predicted probability of the first event satisfies the first confidence criterion at 1404.

The indication of the first event and/or the first subset of the images can be persistently stored to preserve evidence of the first event. For example, the indication of the first event and/or the first subset of the images can be stored at one or more data storages 114, 154 of the fleet management system 110 and/or one or more computing devices 150. The indication of the first event and/or the first subset of the images may be stored to exonerate drivers, combat fraudulent claims, expedite insurance settlements, and/or implement driver coaching.

In some embodiments, one or more actions can automatically be triggered in response to the indication of the first event and/or the first subset of the images. For example, one or more users 160 can be notified of the first event. The users 160 can be notified using the indication of the first event and/or the first subset of the images. In some embodiments, at least one user 160 that is remotely located from the imaging device 130 can be notified of the first event. For example, the at least one user 160 may include, but is not limited to, a fleet manager of a fleet to which the vehicle 120 belongs, an insurance entity insuring the vehicle 120, emergency services in the geographical area the vehicle 120 is located, and/or roadside assistance services in the geographical area the vehicle 120. This can allow one or more users 160 to respond to the first event, for example, mitigating the consequences of one or more unsafe driving events and/or preventing future unsafe driving events. In some embodiments, the at least one user 160 can be notified by a notification that is transmitted to at least one computing device 150 associated with the user 160. In some embodiments, the at least one user 160 can be notified by at least one report that is accessible through the at least one computing device 150.

At 1406, at least one second machine learning model can be applied to a second subset of the images (i.e., to perform a "second take"). The at least one second machine learning model can detect a second event and determine a predicted probability of the second event based on the second subset of the images.

The second subset of the images can also include images associated with the first event. For example, the second subset of the images may also include images captured before, during, and/or after the first event. In some embodiments, the second subset of the images can include more image data than the first subset of the images. For example, the second subset of the images can have a higher frame rate and/or higher resolution than the first subset of the images. In some embodiments, the second subset of the images can have a smaller resolution than the first subset of the images. For example, the second subset of the images can include a region of interest of the first subset of the images. In some embodiments, image processing method 700 can involve, prior to 706, identifying the second subset of the images. For example, the second subset of the images can be identified in response to determining that the predicted probability of the first event satisfies the first confidence criterion at 704. The second subset of the images can be identified from the images based on the first subset of the images. Identifying the second subset of the images may involve identifying additional images associated with but not in the first subset of the images. For example, identifying the second subset of the images can involve identifying the original images that were downsampled to create the first subset of the images. In some embodiments, identifying the second subset of the images can involve cropping a region of interest from the first subset of the images. In some embodiments, the first and second subset of the images can be the same. In some embodiments, the second subset of images can contain less image data than the first subset of the images.

The second event can be any pertinent happening, occurrence, or change detectable from the second subset of the images. The second event may or may not be related to the first event. In some embodiments, the second event can include contextual data related to the first event. For example, the contextual data may include the make, model, and/or license plate number of another vehicle. In some embodiments, the contextual data may include weather, road hazards, traffic signals, traffic signs, pedestrians, and/or other driving conditions. In some embodiments, the second event can include another an unsafe vehicle event. For example, the second event may be an unsafe vehicle maneuver or unsafe driver action. The second event can include an event not detected by the at least one first machine learning model. For example, if the first event is an unsafe vehicle maneuver, the second event may include at least one unsafe driver action. Likewise, if the first event is an unsafe driver action, the second event may include at least one unsafe vehicle maneuver.

The predicted probability of the second event can represent an estimated likelihood of the second event being present in the second subset of the images by the at least one second machine learning model. A high second predicted probability (e.g., 99%, 95%, 90%, 80%, 75%, 60%, etc.) can indicate that the at least one second machine learning model is confident that the second event has occurred, whereas a low predicted probability (e.g., 50%, 40%, 25%, 10%, 5%, 1%, etc.) can indicate that the at least one second machine learning model is confident that the second event did not occur, or is not confident that the second event has occurred.

The at least one second machine learning model can include any suitable machine learning model trained to detect the second event and determine a predicted probability of the second event based on the second subset of the images. The at least one second machine learning model can also include one or more artificial neural networks, decision trees, support-vector machines, nearest neighbors, linear regression, logistical regression, Bayesian networks, random forests, genetic algorithms, and/or ensemble models, and can also be trained using supervised, unsupervised, semi-supervised, reinforcement, or any other suitable learning.

In some embodiments, the at least one second machine learning model can be applied on at least one output of the at least one first machine learning model. For example, the at least one first machine learning model may identify a region of interest in the first subset of the images associated with the first event. The region of interest may be used as an input by the at least one second machine learning model to reduce the search space of the at least one second machine learning model on the second subset of the images, which can improve efficiency and/or accuracy. Similarly, the at least one first machine learning model may identify a label associated with the first event. The label can describe, indicate, or categorize the type of first event detected. The label may be used as an input by the at least one second machine learning model and/or to decide which machine learning models to apply, which may improve efficiency and/or accuracy.

The at least one second machine learning model (i.e., second take) can be executed asynchronously with respect to the at least one first machine learning model. In other words, the "first and second takes" can be executed at different times. In particular, the at least one first machine learning model (i.e., "first take") can be executed at a first time, and the at least one second machine learning model (i.e., "second take") can be executed at a second time subsequent to the first time. As described herein, the at least one first machine learning model (i.e., "first take") can be executed in substantially real-time. Thereafter, the at least one second machine learning model (i.e., "second take") can be executed subsequently and not in real-time. This can allow the at least one second machine learning model (i.e., "second take") to take additional time to provide detection of additional events and/or contextualization of the first event.

The application of the at least one second machine learning model can have a longer cumulative execution time that the application of the at least one first machine learning model. In other words, the execution of the at least one second machine learning model on the second subset of the images (i.e., "second take") can take longer to complete than the execution of the at least one first machine learning model on the first subset of the images (i.e., "first take"). In some embodiments, the longer cumulative execution time can be a consequence of the first subset of the images having less image data (e.g., lower resolution and/or lower frame rate) than the second subset of the images. In some embodiments, the longer cumulative execution time can be a consequence of at least one second machine learning model (i.e., "second take") having more machine learning models than the at least one first machine learning model (i.e., "first take"). In some embodiments, the at least one second machine learning models (i.e., "second take") can include larger, more complex, and/or computationally-heavier machine learning models than the at least one first machine learning model (i.e., "first take").

In some embodiments, the at least one second machine learning model (i.e., "second take" can be executed on a different processor than the at least one first machine learning model (i.e., "first take"). For example, the at least one first machine learning model may be executed on at least one first processor, whereas the at least one second machine learning model may be executed on at least one second processor. In some embodiments, the at least one second machine learning model may be executed on at least one primary processor, whereas the at least one first machine learning model may be executed on at least one coprocessor. The at least one primary processor can be more efficient at performing larger and/or more complex tasks than the at least one specialized processor. Hence, the at least one primary processor can be better suited to perform "second takes" asynchronously and with longer execution times. In some embodiments, the at least one primary processor can include at least one CPU. In some embodiments, the at least one second machine learning model and the at least one first machine learning model can be executed on the same one or more processors. In some embodiments, the at least one second machine learning model and the at least one first machine learning model can be executed on different cores of the same processor.

At 1408, it can be determined whether the predictive probability of the second event satisfies a second confidence criterion. If the predicted probability of the second event satisfies the second confidence criterion, image processing method 1400 can proceed to 1410.

The second confidence criterion can be any suitable condition for confirming the occurrence of the second event, which can trigger transmission of an indication of the second event at 1410. The second confidence criterion can vary depending on the type of event and desired detection sensitivity and specificity. A less strict second confidence criterion can reduce false negatives at the cost of increased false positives, whereas a more strict second confidence criterion can reduce false positives at the cost of increased false negatives. Hence, the second confidence criterion can be selected to balance sensitivity/recall versus specificity/precision. In some embodiments, satisfying the second confidence criterion can involve meeting and/or exceeding a predetermined minimum threshold. For example, the second confidence criterion may be satisfied if the predicted probability of the second event is greater than 40%, 50%, 60%, 75%, 80%, 90%, 95%, 99% etc.

At 1410, an indication of the second event can be transmitted. For example, an indication of the second event can be transmitted to the fleet management system 110 and/or at least one computing device 150. The indication of the second event can be used to notify one or more users 160 remotely located from the imaging device 130. In some embodiments, the second subset of images can also be transmitted, which can also be used to notify one or more users 160. In some embodiments, the indication of the second event can be transmitted with an indication of the first event.

The indication of the second event can be any suitable data indicating the occurrence of the second event. For example, the indication may be an event record, data log, data entry, status, flag, etc. The indication of the second event may be stored in association with the second subset of the images. In some embodiments, the indication of the second event can be a label. The label can describe, indicate, or categorize the type of event detected in the second subset of the images. The label can be generated in response to determining that the predicted probability of the second event satisfies the second confidence criterion at 1408.

The indication of the second event and/or the second subset of the images can be persistently stored to preserve evidence of the second event. For example, the indication of the second event and/or the second subset of the images can be stored at one or more data storages 114, 154 of the fleet management system 110 and/or one or more computing devices 150. The indication of the second event and/or the second subset of the images may be stored to exonerate drivers, combat fraudulent claims, expedite insurance settlements, and/or implement driver coaching.

In some embodiments, one or more actions can automatically be triggered in response to the indication of the second event and/or the second subset of the images. For example, one or more users 160 can be notified of the second event. The users 160 can be notified using the indication of the second event and/or the second subset of the images. In some embodiments, at least one user 160 that is remotely located from the imaging device 130 can be notified of the second event. For example, the at least one user 160 may include, but is not limited to, a fleet manager of a fleet to which the vehicle 120 belongs, an insurance entity insuring the vehicle 120, emergency services in the geographical area the vehicle 120 is located, and/or roadside assistance services in the geographical area the vehicle 120. This can allow one or more users 160 to respond to the second event, for example, mitigating the consequences of one or more unsafe driving events and/or preventing future unsafe driving events. This may also provide one or more users 160 with additional contextual information for the first event. In some embodiments, the at least one user 160 can be notified by a notification that is transmitted to at least one computing device 150 associated with the user 160. In some embodiments, the at least one user 160 can be notified by at least one report that is accessible through the at least one computing device 150.

In some embodiments, image processing method 1400 can be repeated, iterated, or continuously executed. This can enable image processing method 1400 to detect additional events. For example, after 1410, image processing method 1400 can proceed back to 1402 (i.e., applying the at least one first machine learning model to another first subset of the images captured by the imaging device 130). Likewise, if the predicted probability of the first event is determined not to satisfy the first confidence criterion at 1404, image processing method 1400 can also proceed to back to 1402. Similarly, if the predicted probability of the second event is determined to not satisfy the second confidence criterion at 1408, image processing method 1400 can also proceed back to 1402. It should be appreciated that various combinations and/or variations of image processing method 1400 are possible. In some embodiments, one or more acts may be added, removed, substituted, and/or reordered.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. An onboard imaging device for monitoring a vehicle comprising:

at least one camera operable to capture images depicting an area in front of the vehicle and/or an interior of the vehicle; and at least one processor comprising at least one primary processor and at least one coprocessor, the at least one processor operable to:

apply, by the at least one coprocessor, at least one first machine learning model to a first subset of the images to detect an unsafe driving event and determine a first predicted probability of the unsafe driving event, the at least one first machine learning model being executed in substantially real-time with respect to the first subset of the images being captured;

determine whether the first predicted probability of the unsafe driving event satisfies a first confidence criterion;

in response to determining that the first predicted probability of the unsafe driving event satisfies a first confidence criterion:

apply by the at least one primary processor, at least one second machine learning model to a second subset of the images to determine a second predicted probability of the unsafe driving event, the at least one second machine learning model being executed asynchronously with respect to the at least one first machine learning model, the application of the at least one of second machine learning model having a longer cumulative execution time than the application of the at least one first machine learning model, and the second subset of the images comprising more image data than the first subset of the images;

determine whether the second predicted probability of the unsafe driving event satisfies a second confidence criterion; and in response to determining that the second predicted probability of the unsafe driving event satisfies the second confidence criterion, transmit an indication of the unsafe driving event, whereby a user remotely located from the imaging device can be notified of the unsafe driving event.

2. The imaging device of claim 1, wherein the first subset of the images has a lower frame rate than the second subset of the images.

3. The imaging device of claim 1, wherein the at least one coprocessor comprises at least one graphical processing unit (GPU) and/or at least one digital signal processor (DSP) and the at least one primary processor comprises at least one central processing unit (CPU).

4. The imaging device of claim 1, wherein:

applying the at least one second machine learning model to the second subset of the images comprises applying the at least one second machine learning model to the second subset of the images to detect at least one other unsafe driving event that was not detected by the at least one first machine learning model; and an indication of the at least one other unsafe driving event is also transmitted with the indication of the unsafe driving event.

5. The imaging device of claim 1, wherein:

applying the at least one second machine learning model to the second subset of the images comprises applying at least one second machine learning model to the second subset of the images to identify contextual data associated with the unsafe driving event; and the contextual data is also transmitted with the indication of the first unsafe driving event.

6. The imaging device of claim 1, wherein the at least one processor is further operable to:

determine whether the first predicted probability of the unsafe driving event satisfies a third confidence criterion; and in response to determining that the first predicted probability of the unsafe driving event satisfies the third confidence criterion, generate an audio alert at the imaging device.

7. The imaging device of claim 1, wherein the second confidence criterion is stricter than the first confidence criterion.

8. The imaging device of claim 1, further comprising:

at least one accelerometer operable to generate acceleration data; and at least one GPS receiver operable to generate location data; wherein the at least one processor is further operable to:

in response to determining that the predicted probability of the unsafe driving event does not satisfy the first confidence criterion, determine whether at least one of the acceleration data or the location data satisfies a fourth confidence criterion; and in response to determining that the at least one of the acceleration data or the location data satisfies a fourth confidence criterion, apply the at least one second machine learning model to the second subset of the images to determine the second predicted probability of the event.

9. The imaging device of claim 1, wherein the unsafe driving event comprises:

the vehicle tailgating another vehicle, the vehicle nearly colliding or colliding with another vehicle and/or other object, the vehicle straddling two lanes, the vehicle performing a rolling stop, the vehicle crossing a solid lane, a driver of the vehicle drinking and/or eating, the driver not wearing a seatbelt, the driver using a phone, the driver smoking, the driver not viewing the road, and/or the driver yawning.

10. The imaging device of claim 1, wherein the at least one first machine model and the at least one second machine learning model comprise at least one common model.

11. A method for asynchronously processing image data, the method comprising operating at least one processor, comprising at least one primary processor and at least one coprocessor, to:

capture, using at least one camera, images of an area in front of a vehicle and/or an interior of the vehicle;

apply, by the at least one coprocessor, at least one first machine learning model to a first subset of the images to detect an unsafe driving event and determine a first predicted probability of the unsafe driving event, the at least one first machine learning model being executed in substantially real-time with respect to the first subset of the images being captured;

determine whether the first predicted probability of the unsafe driving event satisfies a first confidence criterion;

in response to determining that the first predicted probability of the unsafe driving event satisfies a first confidence criterion:

apply, by the at least one primary processor, at least one second machine learning model to a second subset of the images to determine a second predicted probability of the unsafe driving event, the at least one second machine learning model being executed asynchronously with respect to the at least one first machine learning model, the application of the at least one of second machine learning model having a longer cumulative execution time than the application of the at least one first machine learning model, and the second subset of the images comprising more image data than the first subset of the images;

determine whether the second predicted probability of the unsafe driving event satisfies a second confidence criterion; and in response to determining that the second predicted probability of the unsafe driving event satisfies the second confidence criterion, transmit an indication of the unsafe driving event, whereby a user remotely located from the imaging device can be notified of the unsafe driving event.

12. The method of claim 11, wherein the first subset of the images has a lower frame rate than the second subset of the images.

13. The method of claim 11, wherein the at least one coprocessor comprises at least one graphical processing unit (GPU) and/or at least one digital signal processor (DSP) and the at least one primary processor comprises at least one central processing unit (CPU).

14. The method of claim 11, wherein:

applying the at least one second machine learning model to the second subset of the images comprises applying the at least one second machine learning model to the second subset of the images to detect at least one other unsafe driving event that was not detected by the at least one first machine learning model; and an indication of the at least one other unsafe driving event is also transmitted with the indication of the unsafe driving event.

15. The method of claim 11, wherein:

applying the at least one second machine learning model to the second subset of the images comprises applying at least one second machine learning model to the second subset of the images to identify contextual data associated with the unsafe driving event; and the contextual data is also transmitted with the indication of the first unsafe driving event.

16. The method of claim 11, further comprising operating the at least one processor to:

determine whether the first predicted probability of the unsafe driving event satisfies a third confidence criterion; and in response to determining that the first predicted probability of the unsafe driving event satisfies the third confidence criterion, generate an audio alert at the imaging device.

17. The method of claim 11, wherein the second confidence criterion is stricter than the first confidence criterion.

18. The method of claim 11, further comprising operating the at least one processor to:

in response to determining that the predicted probability of the unsafe driving event does not satisfy the first confidence criterion, determine whether at least one of acceleration data or location data satisfies a fourth confidence criterion;

in response to determining that the at least one of the acceleration data or the location data satisfies a fourth confidence criterion, apply the at least one second machine learning model to the second subset of the images to determine the second predicted probability of the event.

19. The method of claim 11, wherein the unsafe driving event comprises:

the vehicle tailgating another vehicle, the vehicle nearly colliding or colliding with another vehicle and/or other object, the vehicle straddling two lanes, the vehicle performing a rolling stop, the vehicle crossing a solid lane, a driver of the vehicle drinking and/or eating, the driver not wearing a seatbelt, the driver using a phone, the driver smoking, the driver not viewing the road, and/or the driver yawning.

20. The method of claim 11, wherein the at least one first machine model and the at least one second machine learning model comprise at least one common model.

21. A non-transitory computer readable medium having instructions stored thereon executable by at least one processor to implement a method for asynchronously processing image data, the at least one processor comprising at least one primary processor and at least one coprocessor, the method comprising operating at least one processor to:

capture, using at least one camera, images of an area in front of a vehicle and/or an interior of the vehicle;

apply, by the at least one coprocessor, at least one first machine learning model to a first subset of the images to detect an unsafe driving event and determine a first predicted probability of the unsafe driving event, the at least one first machine learning model being executed in substantially real-time with respect to the first subset of the images being captured;

determine whether the first predicted probability of the unsafe driving event satisfies a first confidence criterion;

in response to determining that the first predicted probability of the unsafe driving event satisfies a first confidence criterion:

apply, by the at least one primary processor, at least one second machine learning model to a second subset of the images to determine a second predicted probability of the unsafe driving event, the at least one second machine learning model being executed asynchronously with respect to the at least one first machine learning model, the application of the at least one of second machine learning model having a longer cumulative execution time than the application of the at least one first machine learning model, and the second subset of the images comprising more image data than the first subset of the images;

determine whether the second predicted probability of the unsafe driving event satisfies a second confidence criterion; and in response to determining that the second predicted probability of the unsafe driving event satisfies the second confidence criterion, transmit the second subset of the images with an indication of the unsafe driving event, whereby a user remotely located from the imaging device can be notified of the unsafe driving event.

* * * * *